United States Patent
Sueyoshi et al.

(10) Patent No.: US 10,626,893 B2
(45) Date of Patent: Apr. 21, 2020

(54) HYDRAULIC CYLINDER

(71) Applicant: KYB Corporation, Tokyo (JP)

(72) Inventors: Daisuke Sueyoshi, Gifu (JP); Naohide Takimoto, Gifu (JP); Tsuyoshi Watanabe, Gifu (JP); Masahide Kitani, Gifu (JP)

(73) Assignee: KYB Corporation, Tokyo (JP)

( * ) Notice: Subject to any disclaimer, the term of this patent is extended or adjusted under 35 U.S.C. 154(b) by 171 days.

(21) Appl. No.: 15/572,206

(22) PCT Filed: May 11, 2016

(86) PCT No.: PCT/JP2016/064049
§ 371 (c)(1),
(2) Date: Nov. 7, 2017

(87) PCT Pub. No.: WO2016/185982
PCT Pub. Date: Nov. 24, 2016

(65) Prior Publication Data
US 2018/0149176 A1    May 31, 2018

(30) Foreign Application Priority Data

May 15, 2015    (JP) ................... 2015-100031

(51) Int. Cl.
| F15B 15/14 | (2006.01) |
| F16J 15/3236 | (2016.01) |
| F16J 15/48 | (2006.01) |
| F16J 15/16 | (2006.01) |

(52) U.S. Cl.
CPC ......... *F15B 15/1452* (2013.01); *F16J 15/164* (2013.01); *F16J 15/3236* (2013.01); *F16J 15/48* (2013.01)

(58) Field of Classification Search
CPC ..... F15B 15/1452; F15B 15/14; F16J 15/164; F16J 15/32; F16J 15/3204; F16J 15/3232; F16J 15/3236; F16J 15/48; F16J 1/02; F16J 1/08; F16J 1/09; F16J 1/10; F16J 1/12; F16J 15/46
USPC ........................... 92/194, 240, 245; 277/439
See application file for complete search history.

(56) References Cited

U.S. PATENT DOCUMENTS

| 2,614,793 | A | * | 10/1952 | Storm ................... E21B 31/107 137/860 |
| 3,155,015 | A | * | 11/1964 | Genz .......................... F16J 1/02 92/249 |
| 2007/0278749 | A1 | * | 12/2007 | Nakanishi ............. F15B 15/204 277/567 |

(Continued)

FOREIGN PATENT DOCUMENTS

| CN | 103097745 A | 5/2013 |
| JP | S55-113802 U | 8/1980 |
| JP | 2000-9106 A | 1/2000 |

(Continued)

*Primary Examiner* — Michael Leslie
*Assistant Examiner* — Dustin T Nguyen
(74) *Attorney, Agent, or Firm* — Rabin & Berdo, P.C.

(57) ABSTRACT

A hydraulic cylinder includes a cylinder tube, a piston, a piston rod, a bearing, and a seal, wherein the seal is configured to allow the flow of the operating liquid from the rod side chamber toward the anti-rode side chamber through the through passage when the pressure in the rod side chamber is higher than the pressure in the anti-rod side chamber.

14 Claims, 14 Drawing Sheets

(56) References Cited

U.S. PATENT DOCUMENTS

2013/0113165 A1   5/2013  Sueyoshi et al.

FOREIGN PATENT DOCUMENTS

| JP | 2000-170711 A | 6/2000 |
| JP | 2012-154409 A | 8/2012 |

* cited by examiner

HYDRAULIC CYLINDER

TECHNICAL FIELD

The present invention relates to a single acting hydraulic cylinder.

BACKGROUND ART

In the single acting hydraulic cylinder, an internal space of a cylinder tube is partitioned to a rod side chamber and an anti-rod side chamber by a piston. The anti-rod chamber is connected to a hydraulic source through a feed/discharge port formed at a bottom of the cylinder tube. The piston is slidably supported with respect to the cylinder tube by a bearing provided on an outer periphery of the piston.

JP2000-170711A discloses a single acting hydraulic cylinder including a check valve mechanism for discharging an operating liquid leaking out from the anti-rod side chamber to the rod side chamber to the anti-rod side chamber. This check valve mechanism is constituted by a U-ring serving as a seal provided on an outer periphery of the piston and a through hole provided in the piston.

The U-ring is disposed with a lip directed toward the anti-rod side chamber side. The through hole is faced with the U-ring and is opened in the anti-rod side chamber. When a pressure in the rod side chamber is higher than a pressure in the anti-rod side chamber, the U-ring is crushed. As a result, the operating liquid in the rod side chamber is discharged to the anti-rod side chamber through the outer periphery of the U-ring and the through hole.

SUMMARY OF INVENTION

However, the through hole in the piston that is disclosed in JP2000-170711A is formed on an inner side in a radial direction of the piston from the bearing. Thus, the operating liquid in the rod side chamber needs to flow for a relatively long distance from the outer periphery of the U-ring toward the inner side in the radial direction of the piston until it is discharged to the anti-rod side chamber. Therefore, flow resistance caused by the length of the passage is large, and there is a concern that the operating liquid in the rod side chamber is not discharged to the anti-rod side chamber through the passage of the check valve mechanism.

The present invention has an object to provide a hydraulic cylinder which can discharge the operating liquid collecting in the rod side chamber to the anti-rod side chamber more reliably.

According to one aspect of the present invention, a hydraulic cylinder includes a cylinder tube, a piston accommodated in the cylinder tube, the piston being configured to partition an inside of the cylinder tube into a rod side chamber and an anti-rod side chamber to/from which an operating liquid is supplied/discharged, a piston rod coupled with the piston, a bearing provided on an outer periphery of the piston, the bearing being configured to slidably support the piston with respect to the cylinder tube, and an annular seal provided on the outer periphery of the piston, wherein the bearing includes a through passage configured to penetrate in an axial direction of the piston, and the seal is configured to shut off a flow of the operating liquid from the anti-rod side chamber toward the rod side chamber through the through passage when a pressure in the rod side chamber is equal to or lower than a pressure in the anti-rod side chamber, and is configured to allow the flow of the operating liquid from the rod side chamber toward the anti-rode side chamber through the through passage when the pressure in the rod side chamber is higher than the pressure in the anti-rod side chamber.

DESCRIPTION OF EMBODIMENTS

Embodiments of the present invention will be described below by referring to the attached drawings. Here, a hydraulic cylinder in which an operating oil is used as an operating liquid will be described, but this embodiment can be applied to a hydraulic cylinder in which other liquids such as operating water or the like is used as the operating liquid.

<First Embodiment>

First, by referring to FIGS. 1 to 5, a hydraulic cylinder 100 according to a first embodiment of the present invention will be described.

Figure 1:
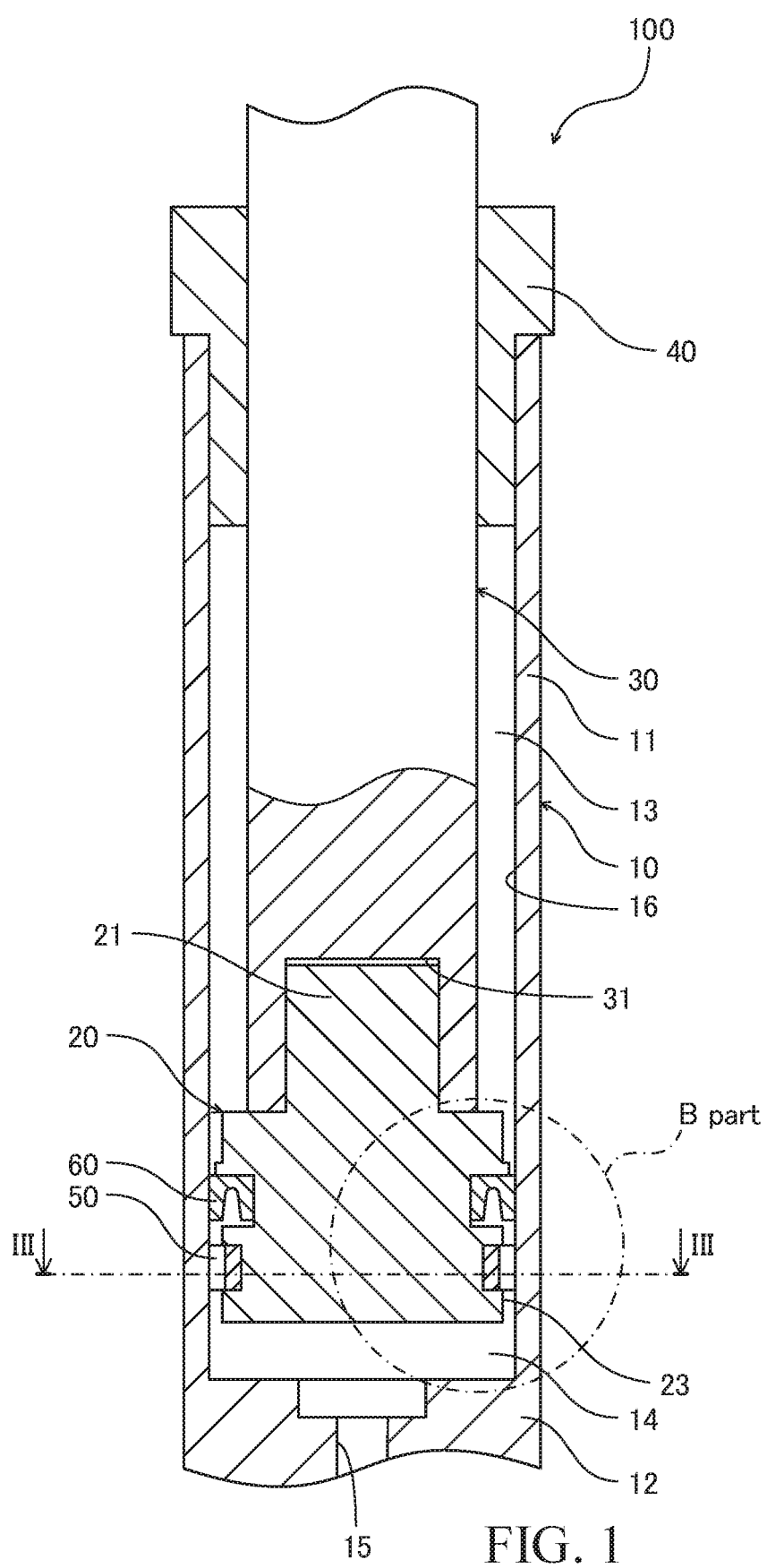
FIG. 1 is a sectional view of a hydraulic cylinder according to a first embodiment of the present invention and shows a contracted state of the hydraulic cylinder.
Figure 2:
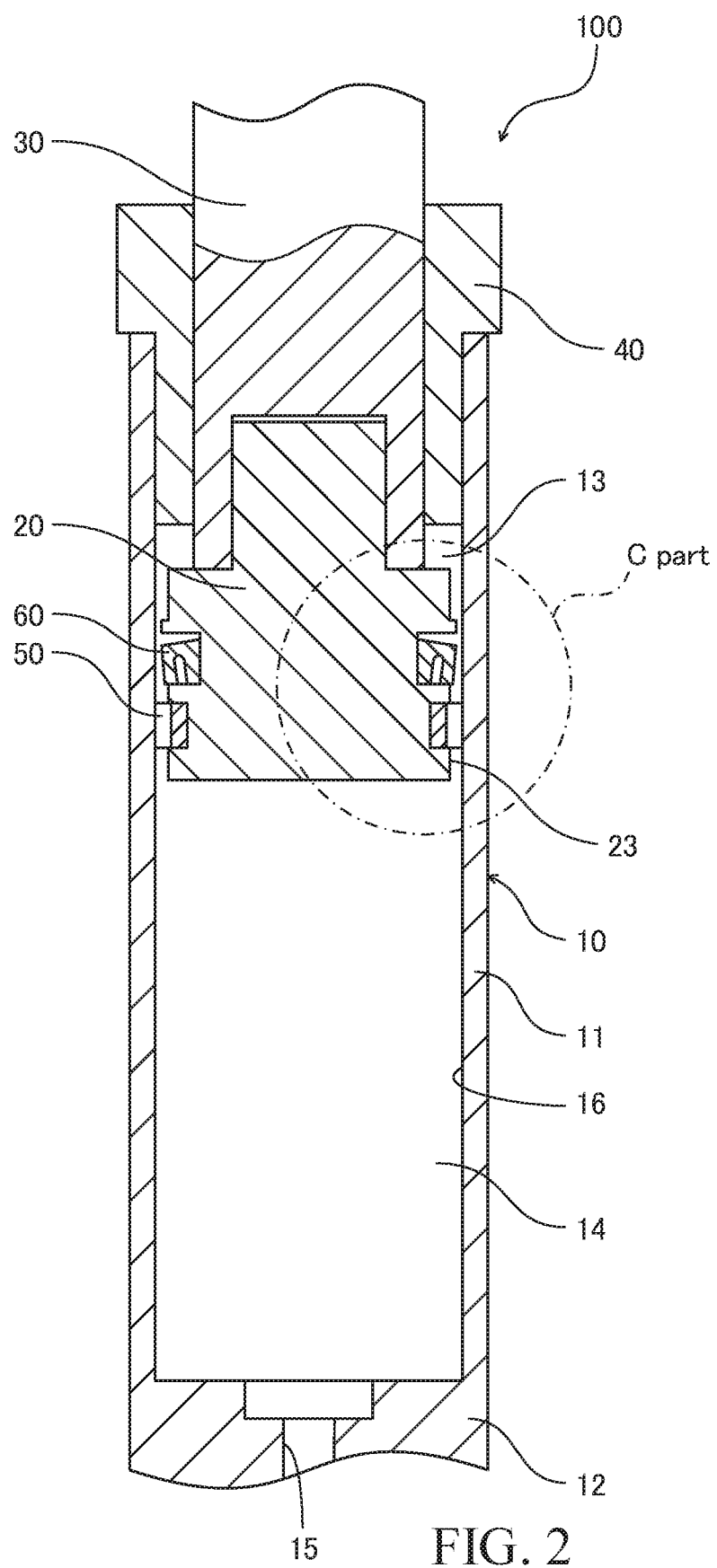
FIG. 2 is a sectional view of the hydraulic cylinder according to the first embodiment of the present invention and shows an extended state of the hydraulic cylinder.

FIGS. 1 and 2 are sectional views of the hydraulic cylinder 100. As illustrated in FIGS. 1 and 2, the hydraulic cylinder 100 includes a cylinder tube 10, a piston 20 slidably accommodated in the cylinder tube 10, and a piston rod 30 coupled with the piston 20.

The cylinder tube 10 has a cylindrical tube 11 and a cylinder bottom 12 provided on one end of the tube 11. In an opening on the other end of the tube 11, a cylinder head 40 is fitted. The cylinder bottom 12 closes the one opening of the tube 11, while the cylinder head 40 closes the other opening of the tube 11. In the following, the other opening of the tube 11 is also referred to as a "head-side opening".

The piston 20 has a projecting portion 21 protruding to the cylinder head 40 side. In an end surface on the cylinder bottom 12 side of the piston rod 30, a dent 31 is formed, and the projecting portion 21 is fitted in the dent 31.

The piston rod 30 extends along an axis of the cylinder tube 10 from the piston 20 and protrudes from the cylinder tube 10 via a head-side opening. The cylinder head 40 slidably supports the piston rod 30. That is, the piston rod 30 is movably inserted into the cylinder tube 10.

An inside of the cylinder tube 10 is partitioned by the piston 20 into a rod side chamber 13 located on the cylinder head 40 side and an anti-rod side chamber 14 located on the cylinder bottom side. In the cylinder bottom 12, a supply/discharge port 15 is formed, and the anti-rod side chamber 14 communicates with the supply/discharge port 15.

The supply/discharge port 15 is selectively connected to a pump (not shown) serving as a hydraulic supply portion and a tank (not shown) serving as an operating oil storing portion through a control valve (not shown). The control valve controls supply of the operating oil from the pump to the anti-rod side chamber 14 and discharge of the operating oil from the anti-rod side chamber 14 to the tank.

When the supply/discharge port 15 is connected to the pump through the control valve, the operating oil discharged from the pump is supplied to the anti-rod side chamber 14 through the supply/discharge port 15. As a result, the piston 20 and the piston rod 30 are moved to the cylinder head 40 side, and the hydraulic cylinder 100 is extended (see FIG. 2). At this time, the rod side chamber 13 is compressed.

When the supply/discharge port 15 is connected to the tank through the control valve, the piston 20 and the piston rod 30 are moved to the cylinder bottom 12 side by a weight of a load (not shown) coupled with the piston rod 30, and the hydraulic cylinder 100 is contracted (see FIG. 1). At this time, the operating oil in the anti-rod side chamber 14 is discharged to the tank through the supply/discharge port 15. The rod side chamber 13 is expanded.

Moreover, the hydraulic cylinder 100 further includes an annular bearing 50 that slidably supports the piston 20 with respect to the cylinder tube 10, and an annular seal 60 that closes a space between an outer peripheral surface 23 of the piston 20 and an inner peripheral surface 16 of the cylinder tube. The bearing 50 and the seal 60 are provided on the outer periphery of the piston 20.

In the hydraulic cylinder 100 as above, the operating oil in the anti-rod side chamber 14 leaks from the seal 60 or the operating oil adhering to the inner peripheral surface 16 of the cylinder tube 10 is scraped by the seal 60 and the operating oil can collect in the rod side chamber 13 in some cases. The operating oil that collects in the rod side chamber 13 inhibits contraction of the rod side chamber 13 involved in movement of the piston 20 and narrows a moving range of the piston 20, that is, an extension/contraction range of the hydraulic cylinder 100.

The hydraulic cylinder 100 according to this embodiment includes a check valve mechanism for discharging the operating oil that collects in the rod side chamber 13 to the anti-rod side chamber 14 in order to prevent narrowing of the extension/contraction range. The check valve mechanism as above will be described by using FIGS. 3 to 5.

Figure 3:
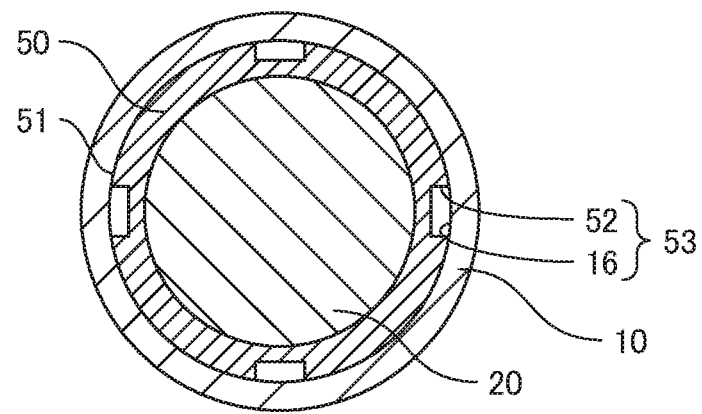
FIG. 3 is a sectional view along III-III line in FIG. 1.
Figure 4:
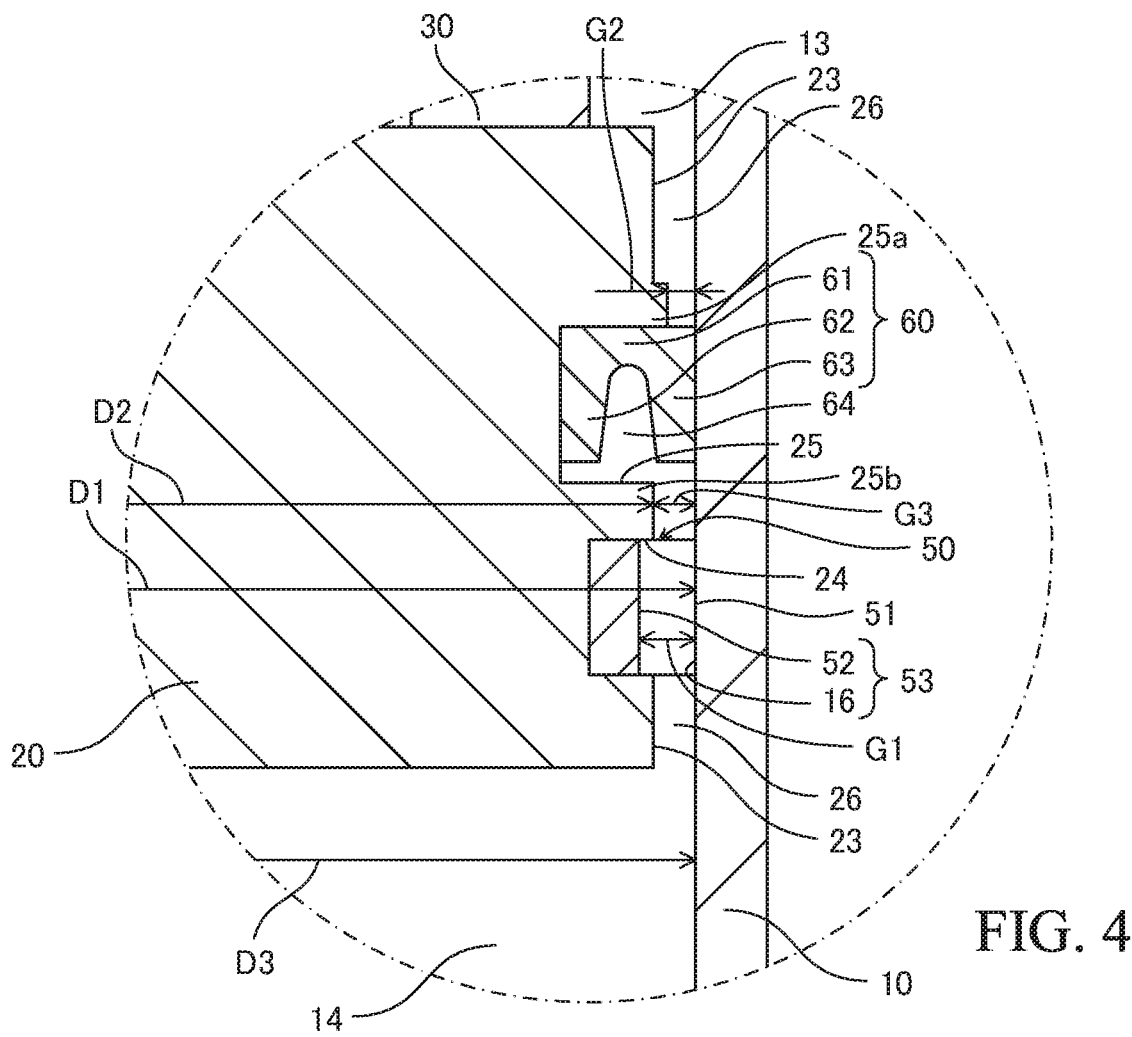
FIG. 4 is an enlarged sectional view of B part in FIG. 1 and shows a state where a pressure in a rod side chamber is equal to or lower than a pressure in an anti-rod side chamber.
Figure 5:
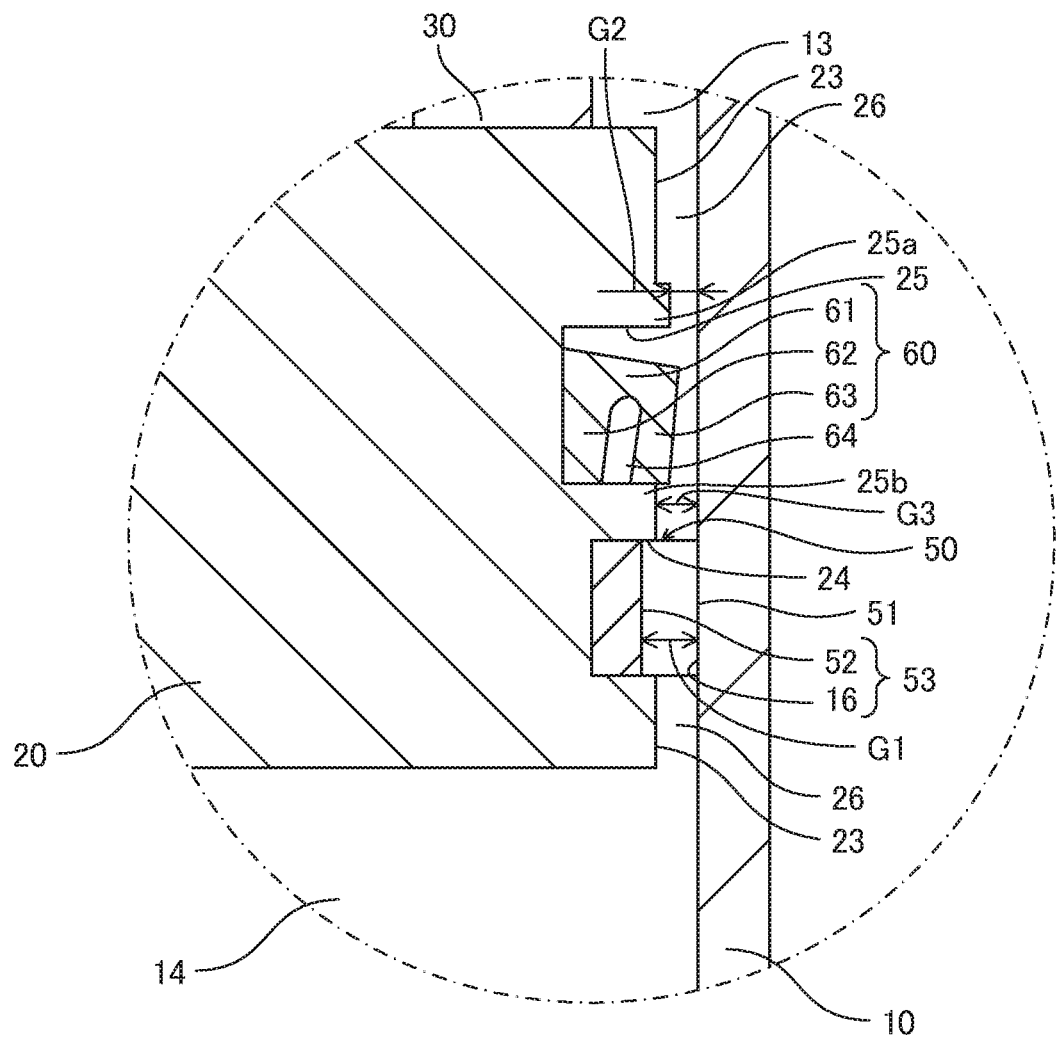
FIG. 5 is an enlarged sectional view of C part in FIG. 2 and shows a state where the pressure in the rod side chamber is higher than the pressure in the anti-rod side chamber.

FIG. 3 is a sectional view along III-III line in FIG. 1. FIG. 4 is an enlarged sectional view of a periphery (B part in FIG. 1) of the bearing 50 and the seal 60 of the hydraulic cylinder 100 in a state where a pressure of the anti-rod side chamber 14 is high, and FIG. 5 is an enlarged sectional view of a periphery (C part in FIG. 2) of the bearing 50 and the seal 60 of the hydraulic cylinder 100 in a state where a pressure of the rod side chamber 13 is high.

As illustrated in FIGS. 3 and 4, the piston 20 has an annular bearing groove 24 and an annular seal groove 25 formed in the outer peripheral surface 23. The bearing 50 is disposed in the bearing groove 24, and the seal 60 is disposed in the seal groove 25.

An outer diameter D2 of the piston 20 is smaller than an outer diameter D1 of the bearing 50. Therefore, in a state where the piston 20 is supported by the bearing 50 with respect to the cylinder tube 10, a gap 26 is present between the outer peripheral surface 23 of the piston 20 and the inner peripheral surface 16 of the cylinder tube 10. In the following, the gap between the outer peripheral surface 23 of the piston 20 and the inner peripheral surface 16 of the cylinder tube 10 is also referred to as a "piston gap 26".

The outer diameter D1 of the bearing 50 is substantially equal to an inner diameter D3 of the cylinder tube 10. Therefore, the bearing 50 is in contact with the inner peripheral surface 16 of the cylinder tube 10 and slides on the inner peripheral surface 16 of the cylinder tube 10 with movement of the piston 20.

In an outer peripheral surface 51 of the bearing 50, a groove 52 is formed. The groove 52 extends in an axial direction of the piston 20 and communicates with the piston gap 26. By means of the groove 52 and the inner peripheral surface 16 of the cylinder tube 10, the through passage 53 that penetrates the bearing 50 is defined.

The seal groove 25 is formed closer to the rod side chamber 13 side than the bearing groove 24. In other words, the seal 60 is located closer to the rod side chamber 13 side than the bearing 50. Therefore, the pressure in the rod side chamber 13 acts on the seal 60 through the piston gap 26, and the pressure in the anti-rod side chamber 14 acts on the seal 60 through the piston gap 26 and the through passage 53.

A wall 25a of the seal groove 25 on the rod side chamber 13 side functions as a first limiting portion which limits movement of the seal 60 to the rod side chamber 13 side. Therefore, even if the pressure of the operating oil acts on the seal 60 from the anti-rod side chamber 14 side, removal of the seal 60 from the piston 20 can be prevented. A depth G1 of the groove 52 is greater than an interval G2 between an outer peripheral surface of the wall 25a serving as the first limiting portion and the inner peripheral surface 16 of the cylinder tube 10.

A wall 25b of the seal groove 25 on the anti-rod side chamber 14 side functions as a second limiting portion which limits movement of the seal 60 to the anti-rod side chamber 14 side. Therefore, even if the pressure of the operating oil acts on the seal 60 from the rod side chamber 13 side, removal of the seal 60 from the piston 20 can be prevented. An interval G3 between an outer peripheral surface of the wall 25b serving as the second limiting portion and the inner peripheral surface 16 of the cylinder tube 10 is greater than the interval G2 between the outer peripheral surface of the wall 25a serving as the first limiting portion and the inner peripheral surface 16 of the cylinder tube 10. The depth G1 of the groove 52 is greater than the interval G3 between the outer peripheral surface of the wall 25b serving as the second limiting portion and the inner peripheral surface 16 of the cylinder tube 10.

The seal 60 has an annular base portion 61, a first extending portion 62 that extends from an inner side of the base portion 61 to the anti-rod side chamber 14 side, and a second extending portion 63 that extends from an outer side of the base portion 61 to the anti-rod side chamber 14 side. A gap 64 is present between the second extending portion 63 and the first extending portion 62.

Since the gap 64 is provided between the first and second extending portions 62 and 63, when the pressure of the operating oil acts on the seal 60, the seal 60 is deformed. Specifically, when the pressure of the operating oil acts on the seal 60 from the rod side chamber 13 side, the operating oil goes from the outer side of the seal 60 toward the gap 64 and presses the base portion 61 and the second extending portion 63 and thus, the seal 60 is deformed so that the second extending portion 63 gets closer to the first extending portion 62. Moreover, when the pressure of the operating oil acts on the seal 60 from the anti-rod side chamber 14 side, the operating oil flows into the gap 64 and expands the gap 64 and thus, the seal 60 is deformed so that the second extending portion 63 is separated away from the first extending portion 62.

When the pressure in the rod side chamber 13 is equal to or lower than the pressure in the anti-rod side chamber 14, the seal 60 is deformed so that the second extending portion 63 is separated away from the first extending portion 62. Thus, as illustrated in FIG. 4, the first extending portion 62 is pressed onto the piston 20, and the second extending portion 63 is pressed onto the cylinder tube 10. As a result, the seal 60 shuts off the flow of the operating oil from the anti-rod side chamber 14 toward the rod side chamber 13 through the through passage 53.

When the pressure in the rod side chamber 13 is higher than the pressure in the anti-rod side chamber 14, the seal 60 is deformed so that the second extending portion 63 gets closer to the first extending portion 62. Thus, as illustrated in FIG. 5, the second extending portion 63 is separated away from the cylinder tube 10. As a result, the seal 60 allows the flow of the operating oil from the rod side chamber 13 toward the anti-rod side chamber 14 through the through passage 53.

Since the seal 60 allows the flow of the operating oil, the operating oil that collects in the rod side chamber 13 is discharged to the anti-rod side chamber 14 through the piston gap 26 and the through passage 53. Therefore, when the hydraulic cylinder 100 is extended, the rod side chamber 13 can be sufficiently contracted, and an extending stroke of the hydraulic cylinder 100 can be sufficiently ensured.

As described above, in this embodiment, the check valve mechanism is constituted by the seal 60 and the through passage 53. By means of the check valve mechanism, narrowing of the extension/contraction range of the hydraulic cylinder 100 can be prevented.

In this embodiment, when the pressure in the rod side chamber 13 is higher than the pressure in the anti-rod side chamber 14, the operating oil in the rod side chamber 13 flows to the anti-rod side chamber 14 through the through passage 53 penetrating the bearing 50 and thus, there is no need to provide a passage in the piston 20. Thus, the discharge of the operating oil from the rod side chamber 13 to the anti-rod side chamber 14 needs little flow from the outer periphery of the seal 60 toward the inner side in the radial direction of the piston 20. Therefore, flow resistance in the passage from the rod side chamber 13 to the anti-rod side chamber 14 becomes smaller, and the operating oil that collects in the rod side chamber 13 can be discharged to the anti-rod side chamber 14 more reliably.

In this embodiment, the seal 60 has a U-shaped section in a state where a pressure of the operating oil does not act on the seal 60, that is, the first and second extending portions 62 and 63 extend in parallel and the roots of the first and second extending portions 62 and 63 have round shapes. The seal 60 having such a shape is also called a "U-ring". The seal 60 in this embodiment is not limited to the U-ring but may be a seal such as a V-ring.

Figure 6:
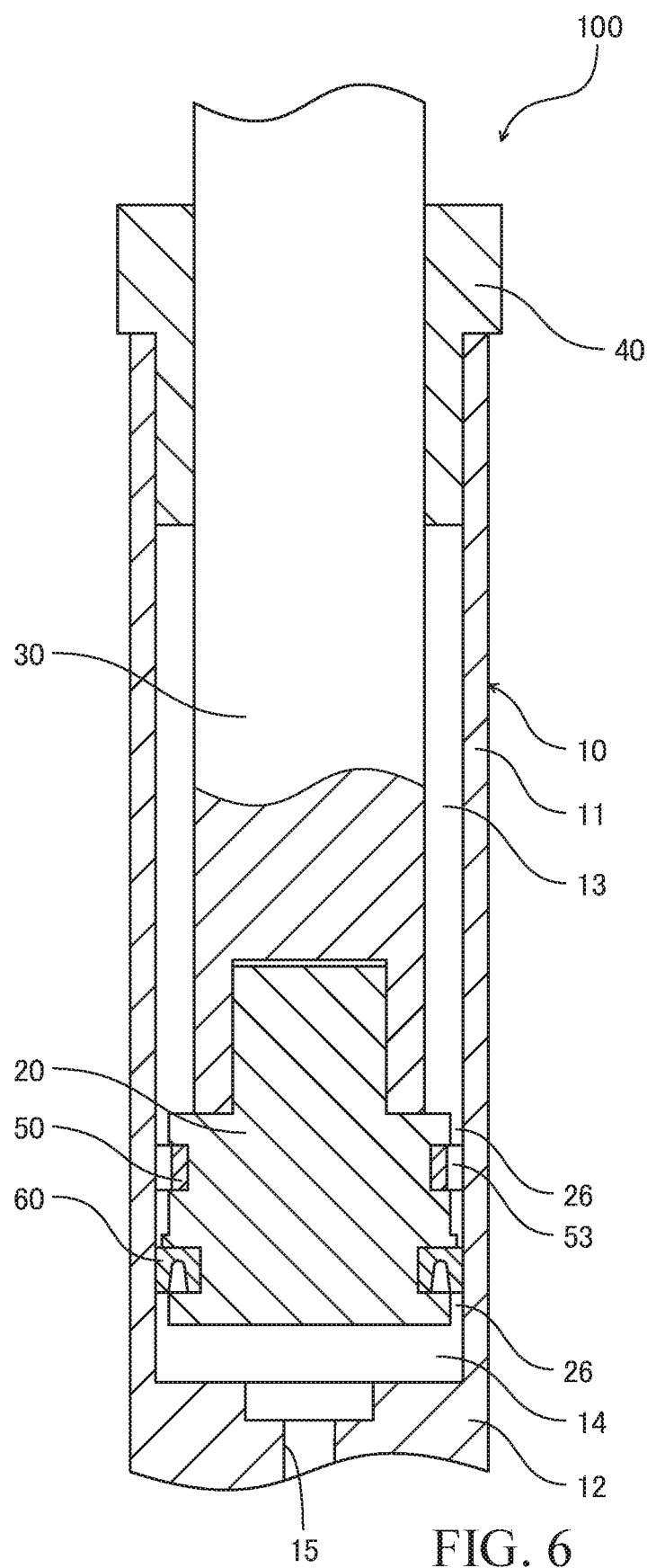
FIG. 6 is a sectional view of the hydraulic cylinder according to another example of the first embodiment of the present invention.

Moreover, in this embodiment, the seal 60 is disposed closer to the rod side chamber 13 side than the bearing 50, but as illustrated in FIG. 6, the seal 60 may be disposed closer to the anti-rod side chamber 14 side than the bearing 50. In this case, the pressure in the rod side chamber 13 acts on the seal 60 through the piston gap 26 and the through passage 53, and the pressure in the anti-rod side chamber 14 acts on the seal 60 through the piston gap 26.

When the seal 60 is disposed closer to the anti-rod side chamber 14 side than the bearing 50 (see FIG. 6), the flow of the operating oil from the anti-rod side chamber 14 to the bearing 50 is shut off by the seal 60. Thus, the operating oil is not sufficiently supplied to a sliding surface between the bearing 50 and the tube 11, and there is a concern that slidability and durability lower.

When the seal 60 is disposed closer to the rod side chamber 13 side than the bearing 50 (see FIG. 1 and the like), the flow of the operating oil from the anti-rod side chamber 14 to the bearing 50 is not shut off by the seal 60. Thus, the operating oil is sufficiently supplied to the sliding surface between the bearing 50 and the tube 11, and slidability and durability can be improved. For such reasons, the seal 60 is preferably disposed closer to the rod side chamber 13 side than the bearing 50.

Figure 7:
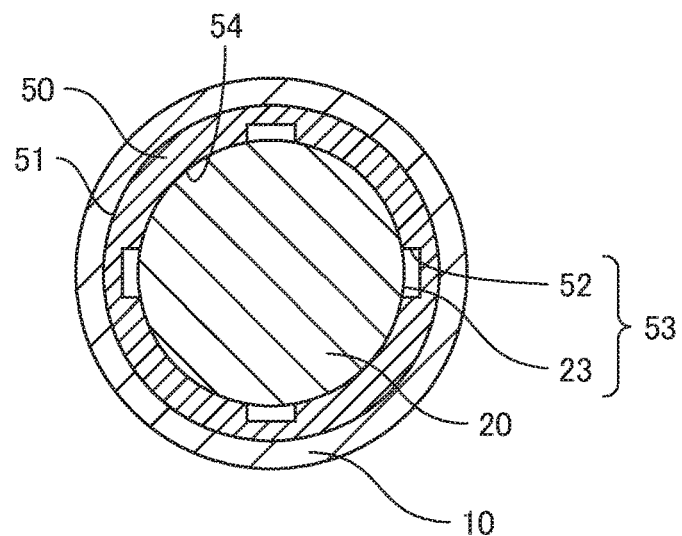
FIG. 7 is a sectional view illustrating another example of a through passage and a view corresponding to the sectional view along the III-III line in FIG. 1.
Figure 8:
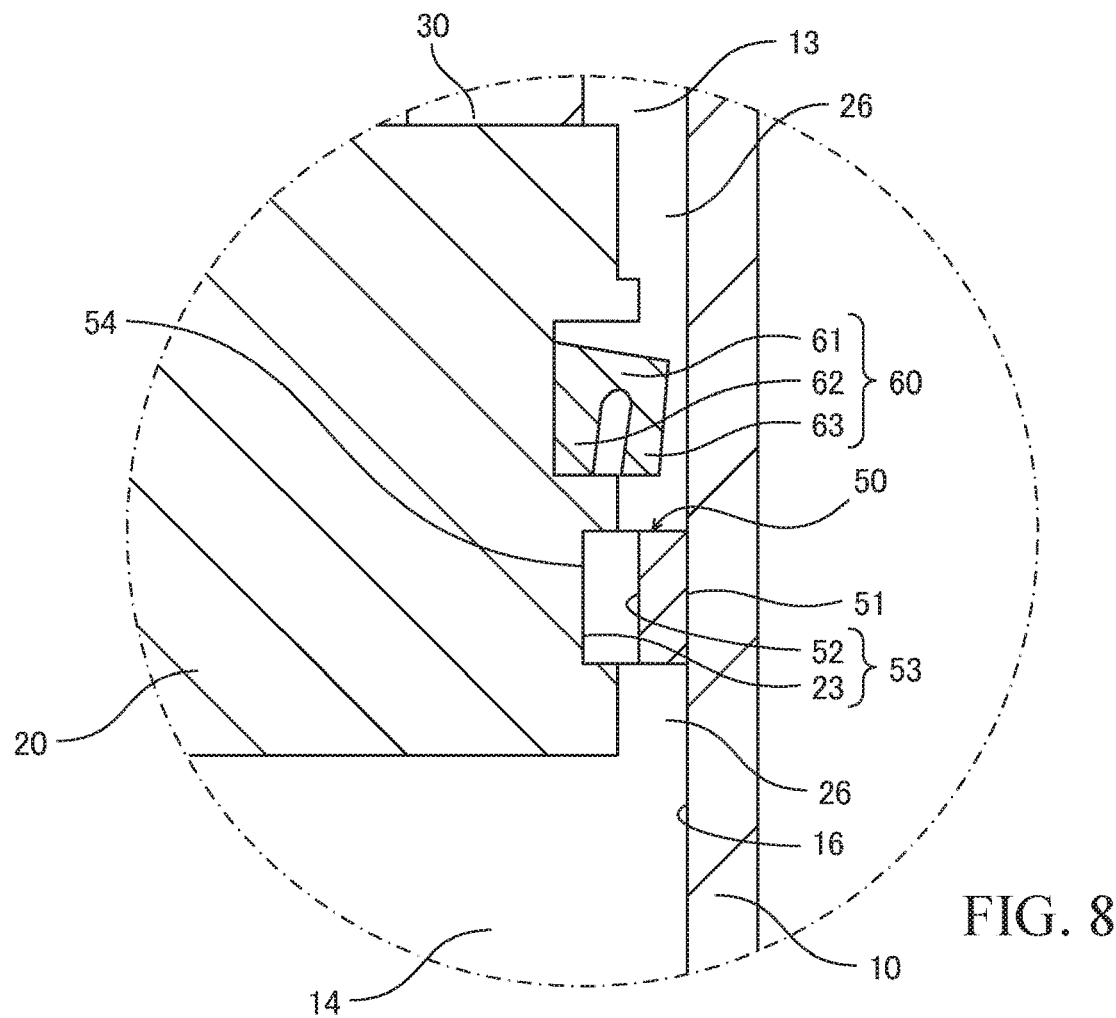
FIG. 8 is an enlarged sectional view of a periphery of the through passage shown in FIG. 7 and is a view corresponding to the enlarged sectional view of the B part in FIG. 1.

Moreover, the through passage 53 is not limited to a form defined by the groove 52 formed in the outer peripheral surface 51 of the bearing 50 and the inner peripheral surface 16 of the cylinder tube 10. As illustrated in FIGS. 7 and 8, the through passage 53 may be formed by the groove 52 formed in the inner peripheral surface 54 of the bearing 50 and the outer peripheral surface 23 of the piston 20. In the form illustrated in FIGS. 7 and 8, the following effects are exerted.

Since the bearing 50 moves together with the piston 20, it slides on the inner peripheral surface 16 of the cylinder tube 10 with movement of the piston 20. Thus, when the through passage 53 is formed by the groove 52 formed in the outer peripheral surface 51 of the bearing 50 and the inner peripheral surface 16 of the cylinder tube 10 (see FIGS. 3 and 4), an edge of the groove 52 slides on the inner peripheral surface 16 of the cylinder tube 10. As a result, there is a concern that the groove 52 (through passage 53) is deformed.

As illustrated in FIGS. 7 and 8, when the through passage 53 is formed by the groove 52 formed in the inner peripheral surface 54 of the bearing 50 and the outer peripheral surface 23 of the piston 20, the edge of the groove 52 does not slide on the inner peripheral surface 16 of the cylinder tube 10. Moreover, since the bearing 50 moves together with the piston 20, even if the piston 20 moves with respect to the cylinder tube 10, the edge of the groove 52 scarcely slides on the outer peripheral surface 23 of the piston 20. Therefore, deformation of the groove 52 (through passage 53) can be prevented, and the operating oil that collects in the rod side chamber 13 can be discharged to the anti-rod side chamber 14 more reliably.

When a backup ring 70 (see FIGS. 13 and 14) which will be described later is used, the seal 60 receives a force from the rod side chamber 13 and is deformed so that the first extending portion 62 is separated away from the piston 20. That is, the operating oil flows between the piston 20 and the seal 60. By forming the through passage 53 by the groove 52 formed in the inner peripheral surface 54 of the bearing 50 and the outer peripheral surface 23 of the piston 20, a bent passage is reduced when the backup ring 70 is used. Therefore, flow resistance in the passage from the rod side chamber 13 to the anti-rod side chamber 14 can be reduced.

Figure 9:
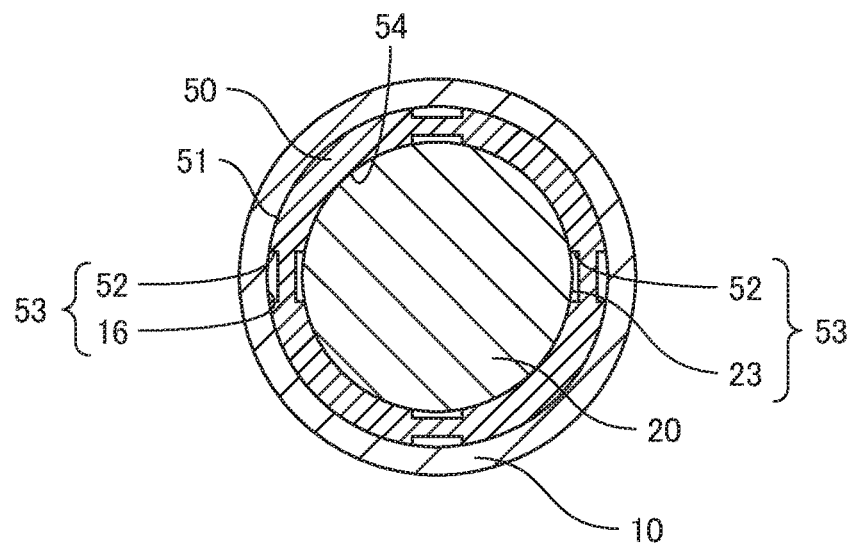
FIG. 9 is a sectional view illustrating still another example of the through passage and is a view corresponding to the sectional view along the III-III line in FIG. 1.
Figure 10:
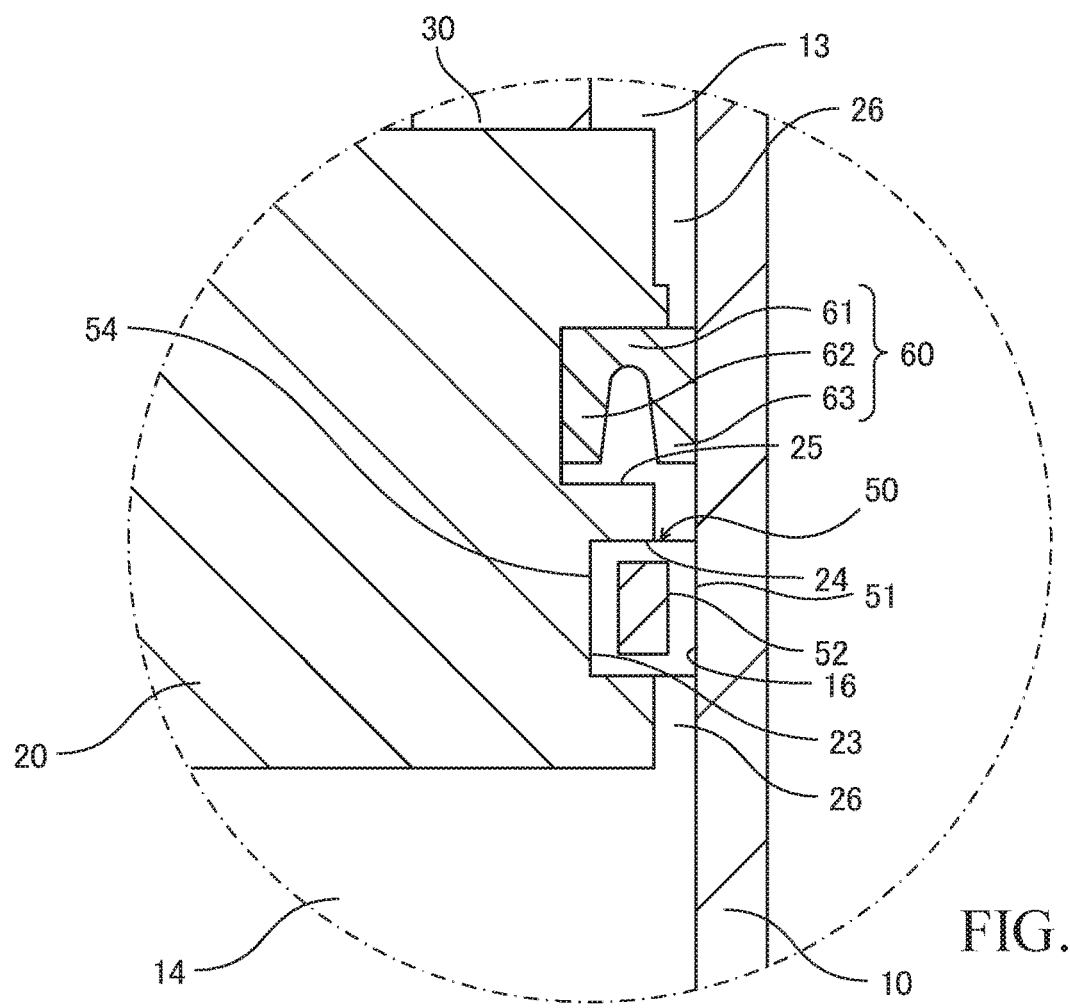
FIG. 10 is an enlarged sectional view of a periphery of the through passage shown in FIG. 9 and is a view corresponding to the enlarged sectional view of the B part in FIG. 1.

As illustrated in FIGS. 9 and 10, the through passage 53 may be provided both in the inner periphery and the outer periphery of the bearing 50. Moreover, the through passage 53 may be constituted by a through hole penetrating the bearing 50 in the axial direction of the piston 20.

However, the through passage 53 is preferably defined by the groove 52 of the bearing 50 and the inner peripheral surface 16 of the cylinder tube 10. Since the inner peripheral surface 16 of the cylinder tube 10 defines the through passage with the groove 52 of the bearing 50, the through passage 53 communicates with the piston gap 26 between the outer peripheral surface 23 of the piston 20 and the inner peripheral surface 16 of the cylinder tube 10 without going through a bent passage. Therefore, flow resistance in the passage from the rod side chamber 13 to the anti-rod side chamber 14 can be reduced, and the operating oil collecting in the rod side chamber 13 can be discharged to the anti-rod side chamber 14 more reliably.

Subsequently, an operation of the hydraulic cylinder 100 will be described by using FIGS. 1 to 5.

First, a case where the operating oil is supplied to the anti-rod side chamber 14 of the hydraulic cylinder 100 will be described.

When the operating oil that is discharged from the pump, not shown, is supplied to the anti-rod side chamber 14 through the supply/discharge port 15, the piston 20 and the piston rod 30 are moved to the cylinder head 40 side, and the hydraulic cylinder 100 is extended. At this time, the rod side chamber 13 is compressed.

When the operating oil collects in the rod side chamber 13, if the piston 20 gets closer to the cylinder head 40, the pressure in the rod side chamber 13 becomes higher than the pressure of the anti-rod side chamber 14. At this time, as illustrated in FIG. 5, the seal 60 receives the pressure of the operating oil from the rod side chamber 13 side and is deformed so that the second extending portion 63 gets closer to the first extending portion 62. As a result, the flow of the operating oil going from the rod side chamber 13 toward the anti-rod side chamber 14 through the through passage 53 is allowed by the seal 60.

Since the pressure in the rod side chamber 13 is higher than the pressure in the anti-rod side chamber 14, the operating oil that collects in the rod side chamber 13 is discharged to the anti-rod side chamber 14 through the piston gap 26 and the through passage 53. Therefore, when the hydraulic cylinder 100 is extended, the rod side chamber 13 can be sufficiently contracted, and the extending stroke of the hydraulic cylinder 100 can be sufficiently ensured. That is, narrowing of the extension/contraction range of the hydraulic cylinder 100 can be prevented.

Subsequently, a case where the operating oil in the anti-rod side chamber 14 is discharged will be described.

When the operating oil in the anti-rod side chamber 14 is discharged through the supply/discharge port 15, the piston 20 and the piston rod 30 are moved to the cylinder bottom 12 side, and the hydraulic cylinder 100 is contracted. At this time, the rod side chamber 13 is expanded.

Since the inside of the rod side chamber 13 becomes a negative pressure, the pressure in the rod side chamber 13 becomes lower than the pressure of the anti-rod side chamber 14. At this time, as illustrated in FIG. 4, the seal 60 receives the pressure of the operating oil from the anti-rod side chamber 14 side and is deformed so that the second extending portion 63 is separated away from the first extending portion 62. As a result, at contraction, the flow of the operating oil going from the rod side chamber 13 toward the anti-rod side chamber 14 through the through passage 53 is shut off by the seal 60. Therefore, leaking-out of the operating oil from the anti-rod side chamber 14 to the rod side chamber 13 can be prevented, and the pressure of the operating oil ejected from the pump can be more efficiently made to act on the piston 20.

According to the aforementioned first embodiment, the following effects are exerted.

When the pressure in the rod side chamber 13 is higher than the pressure in the anti-rod side chamber 14, since the operating oil in the rod side chamber 13 flows to the anti-rod side chamber 14 through the through passage 53 provided in the bearing 50, there is no need to provide a passage in the piston 20. Thus, the discharge of the operating oil from the rod side chamber 13 to the anti-rod side chamber 14 requires little flow from the outer periphery of the seal 60 to the inner side in the radial direction of the piston 20. Therefore, the flow resistance in the passage from the rod side chamber 13 to the anti-rod side chamber 14 becomes smaller, and the operating oil that collects in the rod side chamber 13 can be discharged to the anti-rod side chamber 14 more reliably.

Since the inner peripheral surface 16 of the cylinder tube 10 defines the through passage 53 with the groove 52 of the bearing 50, the through passage 53 communicates with the piston gap 26 between the outer peripheral surface 23 of the piston 20 and the inner peripheral surface 16 of the cylinder tube 10 without going through a bent passage. Therefore, the flow resistance in the passage from the rod side chamber 13 to the anti-rod side chamber 14 can be reduced, and the operating oil that collects in the rod side chamber 13 can be discharged to the anti-rod side chamber 14 more reliably.

The wall 25*a* of the seal groove 25 on the rod side chamber 13 side functions as the first limiting portion for limiting movement of the seal 60 to the rod side chamber 13 side. Therefore, even if the pressure of the operating oil acts on the seal 60 from the anti-rod side chamber 14 side, removal of the seal 60 from the piston 20 can be prevented.

The wall 25b of the seal groove 25 on the anti-rod side chamber 14 side functions as the second limiting portion for limiting movement of the seal 60 to the anti-rod side chamber 14 side. Therefore, even if the pressure of the operating oil acts on the seal 60 from the rod side chamber 13 side, removal of the seal 60 from the piston 20 can be prevented.

<Second Embodiment>

Subsequently, by referring to FIGS. 11 and 12, a hydraulic cylinder 200 according to a second embodiment of the present invention will be described. The same reference numerals are given to the same constitutions as those in the first embodiment, and the explanation will be omitted. In the following, a "thickness" means a dimension of the seal 60 in the radial direction.

Figure 11:
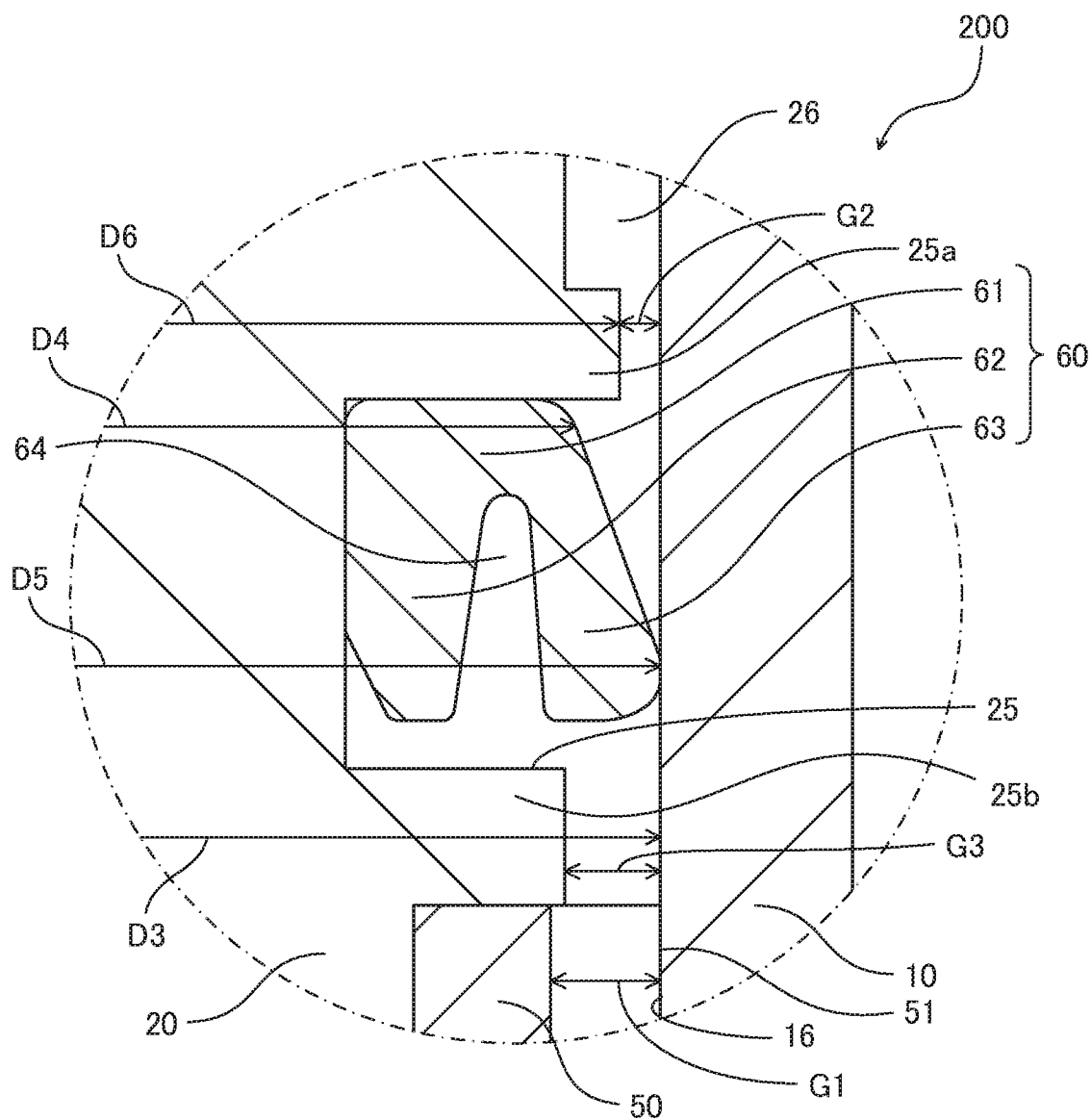
FIG. 11 is an enlarged sectional view of a hydraulic cylinder according to a second embodiment of the present invention and shows a state where a pressure in a rod side chamber is equal to or lower than a pressure in an anti-rod side chamber.
Figure 12:
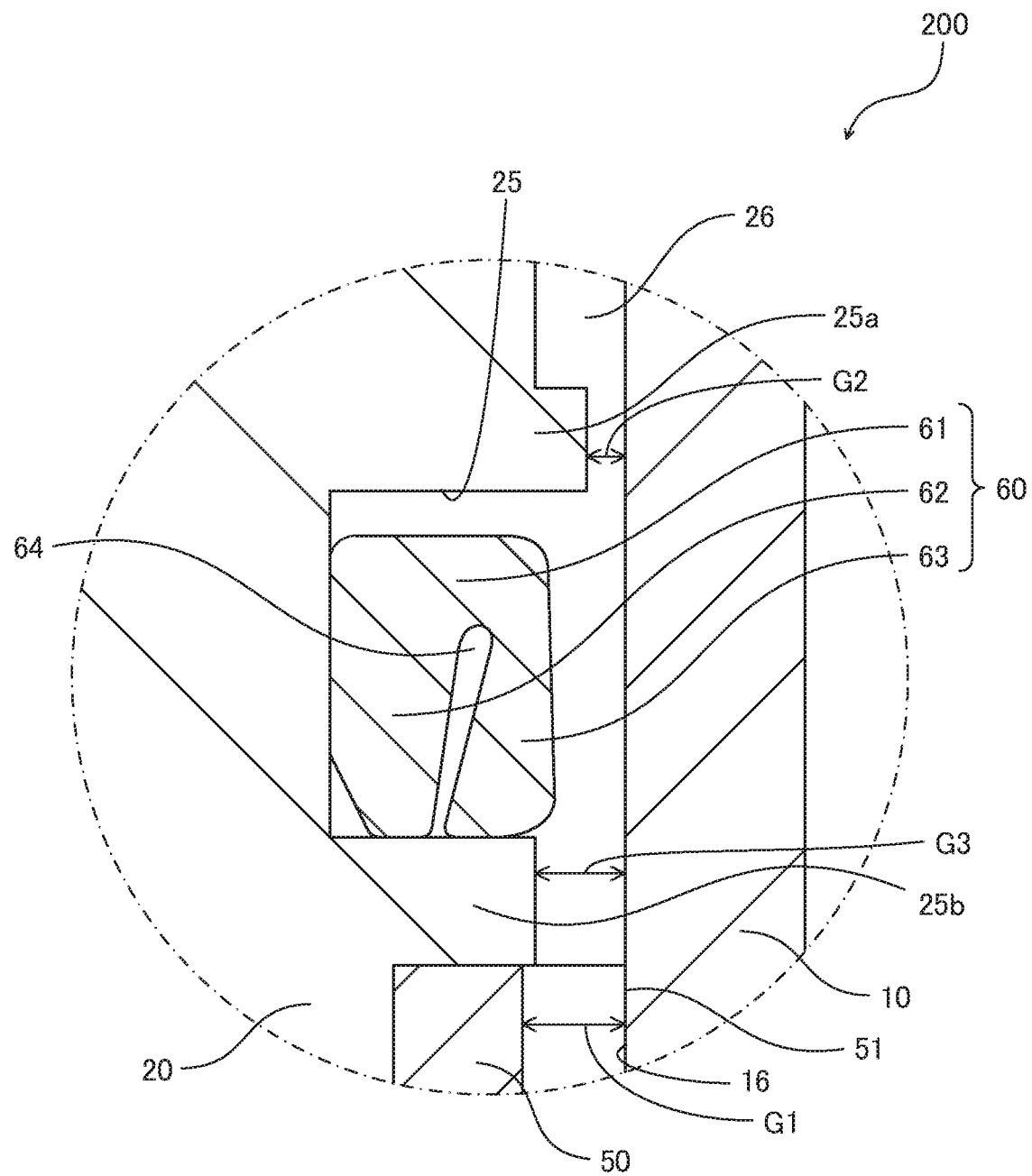
FIG. 12 is an enlarged sectional view of the hydraulic cylinder according to the second embodiment of the present invention and shows a state where the pressure in the rod side chamber is higher than the pressure in the anti-rod side chamber.

FIGS. 11 and 12 are enlarged sectional views of a periphery of the seal 60 in this embodiment. FIG. 11 illustrates a state where the pressure in the rod side chamber 13 is equal to or lower than the pressure in the anti-rod side chamber 14, and FIG. 12 illustrates a state where the pressure in the rod side chamber 13 is higher than the pressure in the anti-rod side chamber 14. The depth G1 of the groove 52 is greater than the interval G2 between the outer peripheral surface of the wall 25a serving as the first limiting portion and the inner peripheral surface 16 of the cylinder tube 10. the interval G3 between an outer peripheral surface of the wall 25b serving as the second limiting portion and the inner peripheral surface 16 of the cylinder tube 10 is greater than the interval G2 between the outer peripheral surface of the wall 25a serving as the first limiting portion and the inner peripheral surface 16 of the cylinder tube 10. The depth G1 of the groove 52 is greater than the interval G3 between the outer peripheral surface of the wall 25b serving as the second limiting portion and the inner peripheral surface 16 of the cylinder tube 10.

As illustrated in FIGS. 11 and 12, a thickness of the second extending portion 63 of the seal 60 is smaller than a thickness of the first extending portion 62. Thus, the second extending portion 63 has rigidity lower than that of the first extending portion 62.

When the pressure in the rod side chamber 13 is higher than the pressure in the anti-rod side chamber 14, the second extending portion 63 is bent to the inner side in the radial direction of the seal 60 (see FIG. 12). As a result, the second extending portion 63 is separated away from the inner peripheral surface 16 of the cylinder tube 10, and a larger gap is formed between the second extending portion 63 and the cylinder tube 10.

As described above, in this embodiment, since the rigidity of the second extending portion 63 is lower than the rigidity of the first extending portion 62, the second extending portion 63 is deformed more easily than the first extending portion 62. Thus, when the pressure in the rod side chamber 13 is higher than the pressure in the anti-rod side chamber 14, the gap (passage) is formed between the second extending portion 63 and the cylinder tube 10.

The passage between the second extending portion 63 and the cylinder tube 10 communicates with the piston gap 26 without going through a bent passage. Therefore, the flow resistance in the passage from the rod side chamber 13 to the anti-rod side chamber 14 can be reduced, and the operating oil collecting in the rod side chamber 13 can be discharged to the anti-rod side chamber 14 more reliably.

Moreover, an outer diameter D4 of the base portion 61 is smaller than an inner diameter D3 of the cylinder tube 10. Thus, there is a gap between the base portion 61 and the cylinder tube 10.

An outer diameter D5 of the second extending portion 63 is larger from the rod side chamber 13 side toward the anti-rod side chamber 14 side, and the outer peripheral surface of the second extending portion 63 is brought into contact with the cylinder tube 10 only at a distal end (see FIG. 11). That is, there is a gap between the portions other than the distal end in the outer peripheral surface of the second extending portion 63 and the cylinder tube 10.

By means of a partial gap between the seal 60 and the cylinder tube 10, the pressure in the rod side chamber 13 acts up to the distal end side of the outer peripheral surface of the second extending portion 63. Thus, when the pressure in the rod side chamber 13 is higher than the pressure in the anti-rod side chamber 14, the second extending portion 63 is deformed toward the first extending portion 62 easily. Therefore, a gap (passage) is formed between the second extending portion 63 and the cylinder tube 10 more easily (see FIG. 12).

The passage between the second extending portion 63 and the cylinder tube 10 communicates with the piston gap 26 without going through a bent passage. Therefore, the flow resistance in the passage from the rod side chamber 13 to the anti-rod side chamber 14 can be reduced, and the operating oil collecting in the rod side chamber 13 can be discharged to the anti-rod side chamber 14 more reliably.

An outer diameter of an end portion in the seal 60 on the rod side chamber 13 side, that is, the outer diameter D4 of the base portion 61 is smaller than an outer diameter D6 of the wall 25a (first limiting portion) in the seal groove 25 on the rod side chamber 13 side. Thus, even if the pressure of the operating oil acts on the seal 60 from the anti-rod side chamber 14 side, the seal 60 does not protrude from the seal groove 25 and does not enter the piston gap 26. Therefore, damage on the seal 60 caused by entry into the piston gap 26 can be prevented.

Since an operation of the hydraulic cylinder 100 according to the second embodiment is substantially the same as the operation of the hydraulic cylinder 100 according to the first embodiment, the explanation will be omitted here.

According to the aforementioned second embodiment, in addition to the effect exerted by the first embodiment, the following effects are exerted.

Since the second extending portion 63 has a dimension of the piston 20 in the radial direction smaller than the first extending portion 62, the rigidity of the second extending portion 63 is lower than the rigidity of the first extending portion 62, and the second extending portion 63 is deformed more easily than the first extending portion 62. Thus, when the pressure in the rod side chamber 13 is higher than the pressure in the anti-rod side chamber 14, a passage is formed between the second extending portion 63 and the cylinder tube 10. This passage communicates with the piston gap 26 without going through a bent passage. Therefore, the flow resistance in the passage from the rod side chamber 13 to the anti-rod side chamber 14 can be reduced, and the operating oil collecting in the rod side chamber 13 can be discharged to the anti-rod side chamber 14 more reliably.

Since the outer diameter D4 of the base portion 61 is smaller than the inner diameter D3 of the cylinder tube 10, and the outer diameter D5 of the second extending portion 63 is larger from the rod side chamber 13 to the anti-rod side chamber 14, a partial gap is formed between the seal 60 and the cylinder tube 10. Thus, when the pressure in the rod side chamber 13 is higher than the pressure in the anti-rod side chamber 14, the pressure of the operating oil acts up to the distal end of the outer peripheral surface of the second extending portion 63, and the second extending portion 63 is deformed easily toward the first extending portion 62. Therefore, the passage can be formed more reliably between the second extending portion 63 and the cylinder tube 10. This passage communicates with the piston gap 26 without going through a bent passage. Therefore, the flow resistance in the passage from the rod side chamber 13 to the anti-rod side chamber 14 can be reduced, and the operating oil that collects in the rod side chamber 13 can be discharged to the anti-rod side chamber 14 more reliably.

Since the outer diameter D4 of the base portion 61 is smaller than the outer diameter D6 of the wall 25a in the seal groove 25 on the rod side chamber 13 side, even if a force acts on the seal 60 from the anti-rod side chamber 14 side, the seal 60 does not protrude from the seal groove 25 and does not enter the piston gap 26. Therefore, damage on the seal 60 caused by entry into the piston gap 26 can be prevented.

<Third Embodiment>

Subsequently, by referring to FIGS. 13 and 14, a hydraulic cylinder 300 according to a third embodiment of the present invention will be described. The same reference numerals are given to the same constitutions as those in the first embodiment, and the explanation will be omitted.

Figure 13:
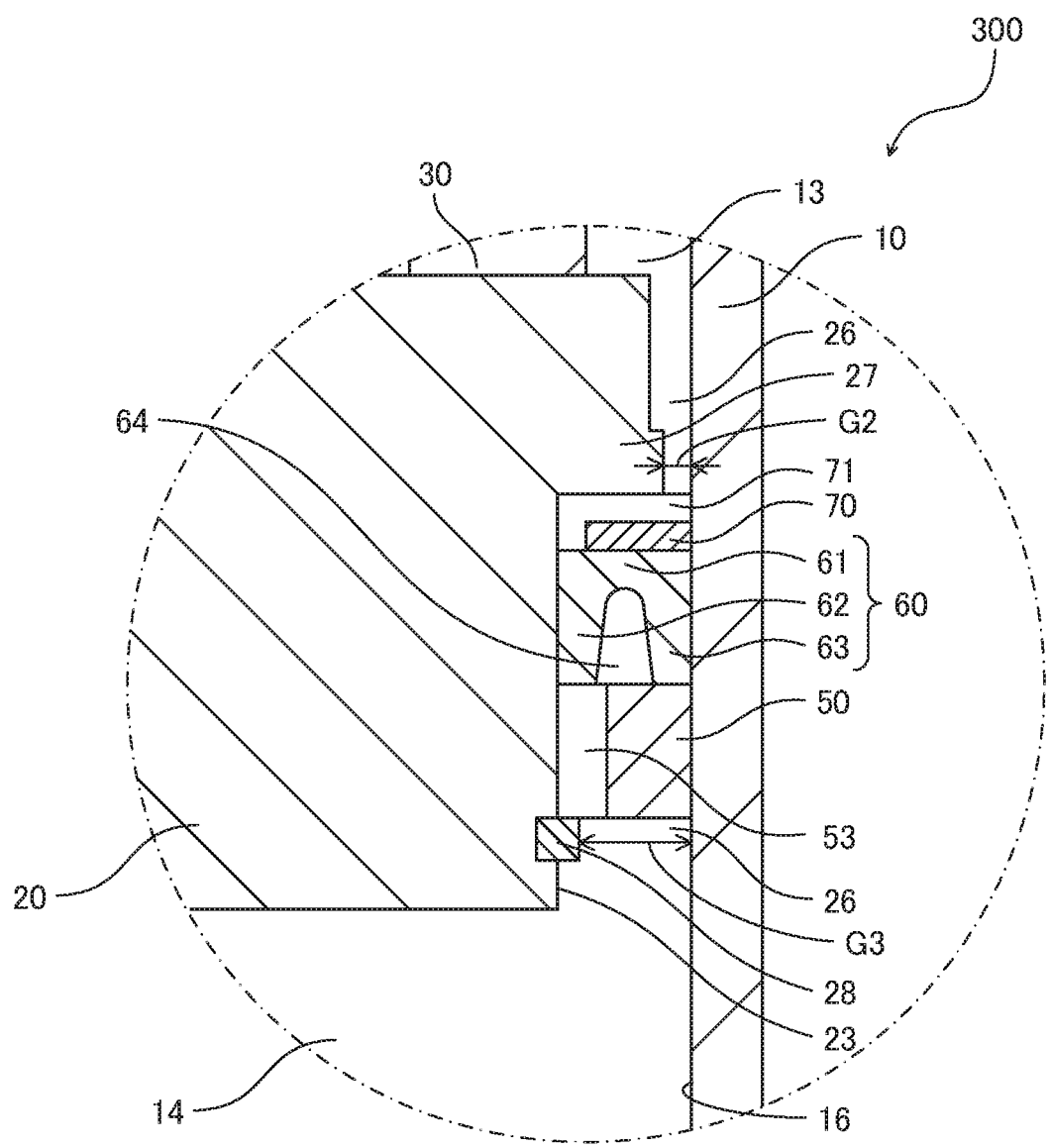
FIG. 13 is an enlarged sectional view of a hydraulic cylinder according to a third embodiment of the present invention and shows a state where a pressure in a rod side chamber is equal to or lower than a pressure in an anti-rod side chamber.
Figure 14:
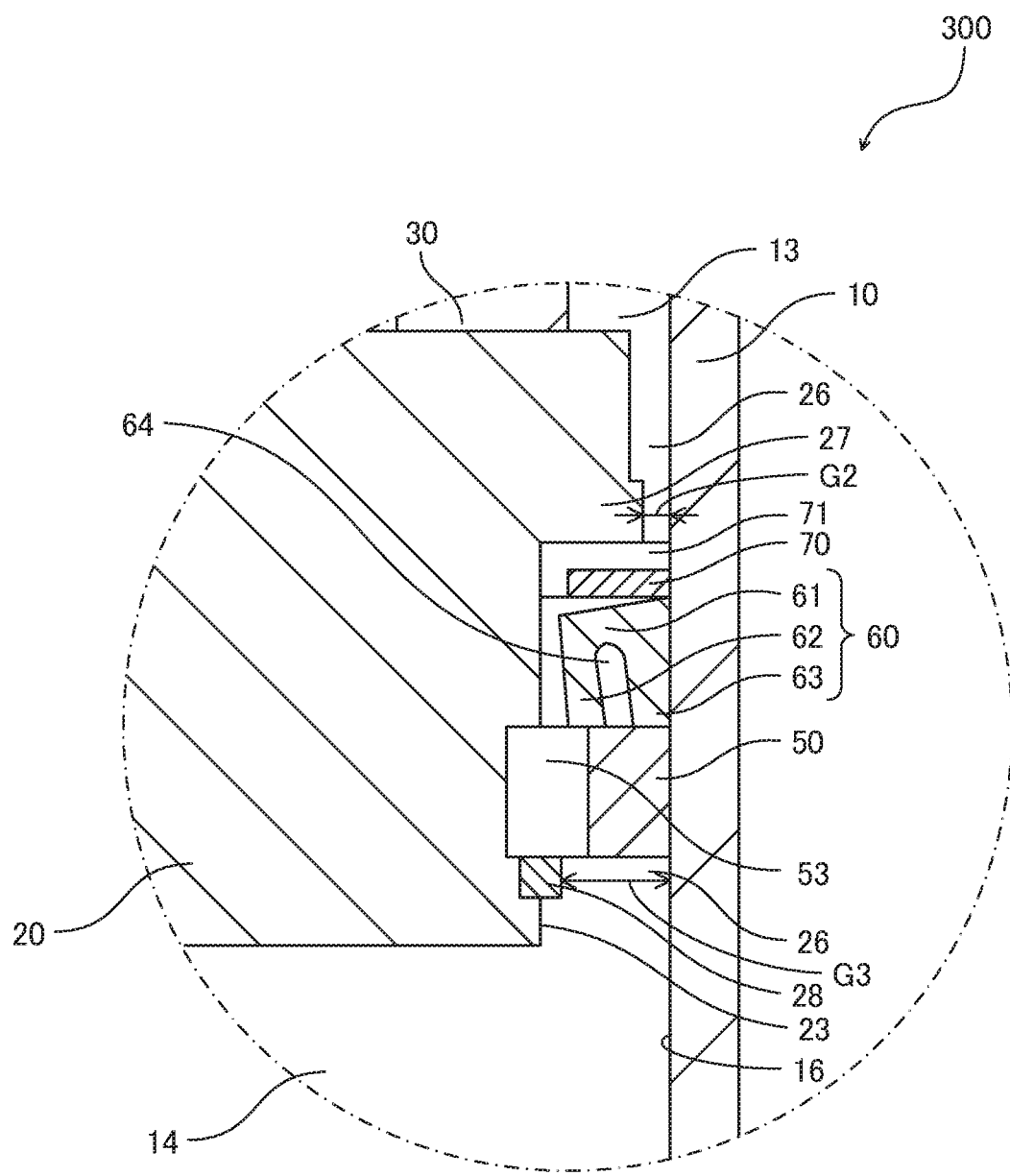
FIG. 14 is an enlarged sectional view of the hydraulic cylinder according to the third embodiment of the present invention and shows a state where the pressure in the rod side chamber is higher than the pressure in the anti-rod side chamber.

FIGS. 13 and 14 are enlarged sectional views of a periphery of the seal 60 in this embodiment. FIG. 13 illustrates a state where the pressure in the rod side chamber 13 is equal to or lower than the pressure in the anti-rod side chamber 14, and FIG. 14 illustrates a state where the pressure in the rod side chamber 13 is higher than the pressure in the anti-rod side chamber 14.

As illustrated in FIGS. 13 and 14, in this embodiment, the piston 20 does not have the bearing groove 24 and the seal groove 25 (see FIGS. 4 and 5) in the first and second embodiments.

On the outer peripheral surface 23 of the piston 20, a step portion 27 is formed closer to the rod side chamber 13 side than the bearing 50 and the seal 60. The step portion 27 functions as the first limiting portion for limiting movement of the seal 60 to the rod side chamber 13 side.

Moreover, on the outer peripheral surface 23 of the piston 20, a stopper 28 is formed closer to the anti-rod side chamber 14 side than the bearing 50 and the seal 60. The stopper 28 functions as the second limiting portion for limiting movement of the seal 60 to the anti-rod side chamber 14 side. An interval G3 between an outer peripheral surface of the stopper 28 serving as the second limiting portion and the inner peripheral surface 16 of the cylinder tube 10 is greater than an interval G2 between an outer peripheral surface of the step portion 27 serving as the first limiting portion and the inner peripheral surface 16 of the cylinder tube 10.

Between the step portion 27 and the seal 60, an annular backup ring 70 is provided. The backup ring 70 is in contact with the inner peripheral surface 16 of the cylinder tube 10. Moreover, rigidity of the backup ring 70 is higher than the rigidity of the seal 60.

The backup ring 70 has a ring passage 71 that extends from the piston gap 26 to the inner side in the radial direction of the piston 20 and that reaches the seal 60. Therefore, the pressure in the rod side chamber 13 acts on the seal 60 through the piston gap 26 and the ring passage 71.

When the pressure in the rod side chamber 13 is higher than the pressure in the anti-rod side chamber 14, the pressure of the operating oil acts on the seal 60 from the rod side chamber 13 side, and the seal 60 is deformed so that the first extending portion 62 gets closer to the second extending portion 63. Thus, as illustrated in FIG. 14, the first extending portion 62 is separated away from the piston 20. That is, the seal 60 allows the flow of the operating oil going from the rod side chamber 13 toward the anti-rod side chamber 14 through the piston gap 26, the ring passage 71, and the through passage 53.

Since the seal 60 allows the flow of the operating oil, the operating oil that collects in the rod side chamber 13 is discharged to the anti-rod side chamber 14 through the piston gap 26, the ring passage 71, and the through passage 53. Therefore, when the hydraulic cylinder 300 is extended, the rod side chamber 13 can be sufficiently contracted, and the extending stroke of the hydraulic cylinder 300 can be sufficiently ensured.

Since the backup ring 70 is in contact with the inner peripheral surface 16 of the cylinder tube 10, even if the force acts on the seal 60 from the anti-rod side chamber 14 side, the seal 60 does not enter the piston gap 26. Therefore, damage on the seal 60 caused by entry into the piston gap 26 can be prevented.

Since an operation of the hydraulic cylinder 300 according to the third embodiment is substantially the same as the operation of the hydraulic cylinder 100 according to the first embodiment, the explanation will be omitted here.

According to the aforementioned third embodiment, in addition to the effect exerted by the first embodiment, the following effects are exerted.

Since the backup ring 70 is provided in contact with the inner peripheral surface 16 of the cylinder tube 10, even if the pressure of the operating oil acts on the seal 60 from the anti-rod side chamber 14 side, the seal 60 does not enter the piston gap 26 between the step portion 27 and the cylinder tube 10. Therefore, damage on the seal 60 caused by entry into the piston gap 26 can be prevented.

<Fourth Embodiment>

Subsequently, by referring to FIG. 15, a hydraulic cylinder 400 according to a fourth embodiment of the present invention will be described. The same reference numerals are given to the same constitutions as those in the first and third embodiments, and the explanation will be omitted.

Figure 15:
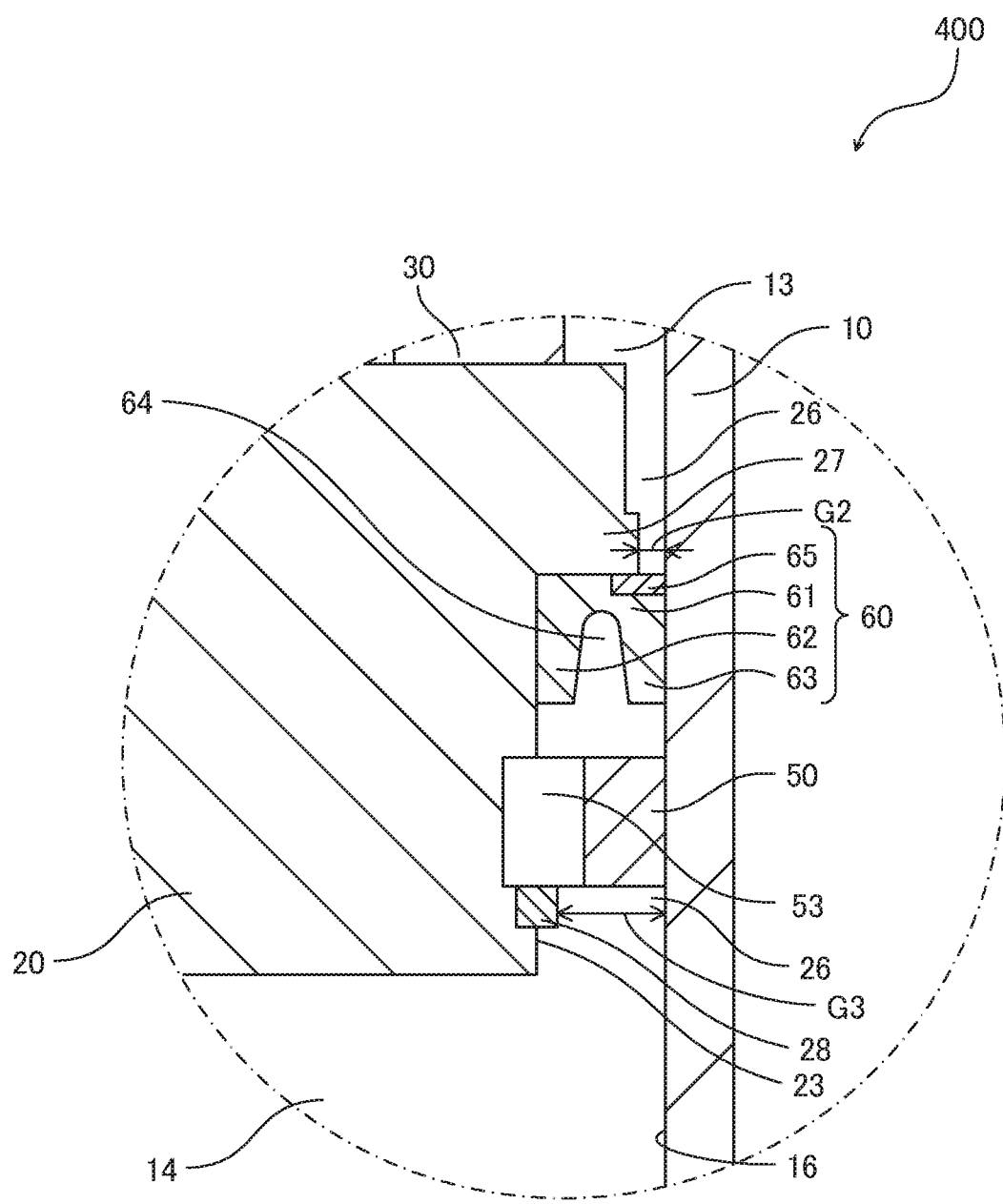
FIG. 15 is an enlarged sectional view of a hydraulic cylinder according to a fourth embodiment of the present invention.

FIG. 15 is an enlarged sectional view of a periphery of the seal 60 according to this embodiment and illustrates a state where the pressure in the rod side chamber 13 is equal to or lower than the pressure in the anti-rod side chamber 14. The interval G3 between the outer peripheral surface of the stopper 28 serving as the second limiting portion and the inner peripheral surface 16 of the cylinder tube 10 is greater than the interval G2 between the outer peripheral surface of the step portion 27 serving as the first limiting portion and the inner peripheral surface 16 of the cylinder tube 10. As illustrated in FIG. 15, the seal 60 has a backup portion 65 provided integrally on the base portion 61. The backup portion 65 is located on the outer side in the radial direction of the seal 60 and on the step portion 27 side. The rigidity of the backup portion 65 is higher than the rigidity of the other portions (the base portion 61 and the first and second extending portions 62 and 63) of the seal 60.

Since the backup portion 65 is on the outer side in the radial direction of the seal 60 and is provided on the step portion 27 side, even if the pressure of the operating oil acts on the seal 60 from the anti-rod side chamber 14 side, the seal 60 does not enter the piston gap 26. Therefore, damage on the seal 60 caused by entry into the piston gap 26 can be prevented.

Since an operation of the hydraulic cylinder 400 according to the fourth embodiment is substantially the same as the operation of the hydraulic cylinder 100 according to the first embodiment, the explanation will be omitted here.

According to the aforementioned fourth embodiment, in addition to the effect exerted by the first embodiment, the following effects are exerted.

Since the backup portion 65 is on the outer side in the radial direction of the seal 60 and is provided on the step portion 27 side, even if the pressure of the operating oil acts on the seal 60 from the anti-rod side chamber 14 side, the seal 60 does not enter the piston gap 26 between the step portion 27 and the cylinder tube 10. Therefore, damage on the seal 60 caused by entry into the piston gap 26 can be prevented.

<Fifth Embodiment>

Subsequently, by referring to FIGS. 16 and 17, a hydraulic cylinder 500 according to a fifth embodiment of the present invention will be described. The same reference numerals are given to the same constitutions as those in the first embodiment, and the explanation will be omitted.

Figure 16:
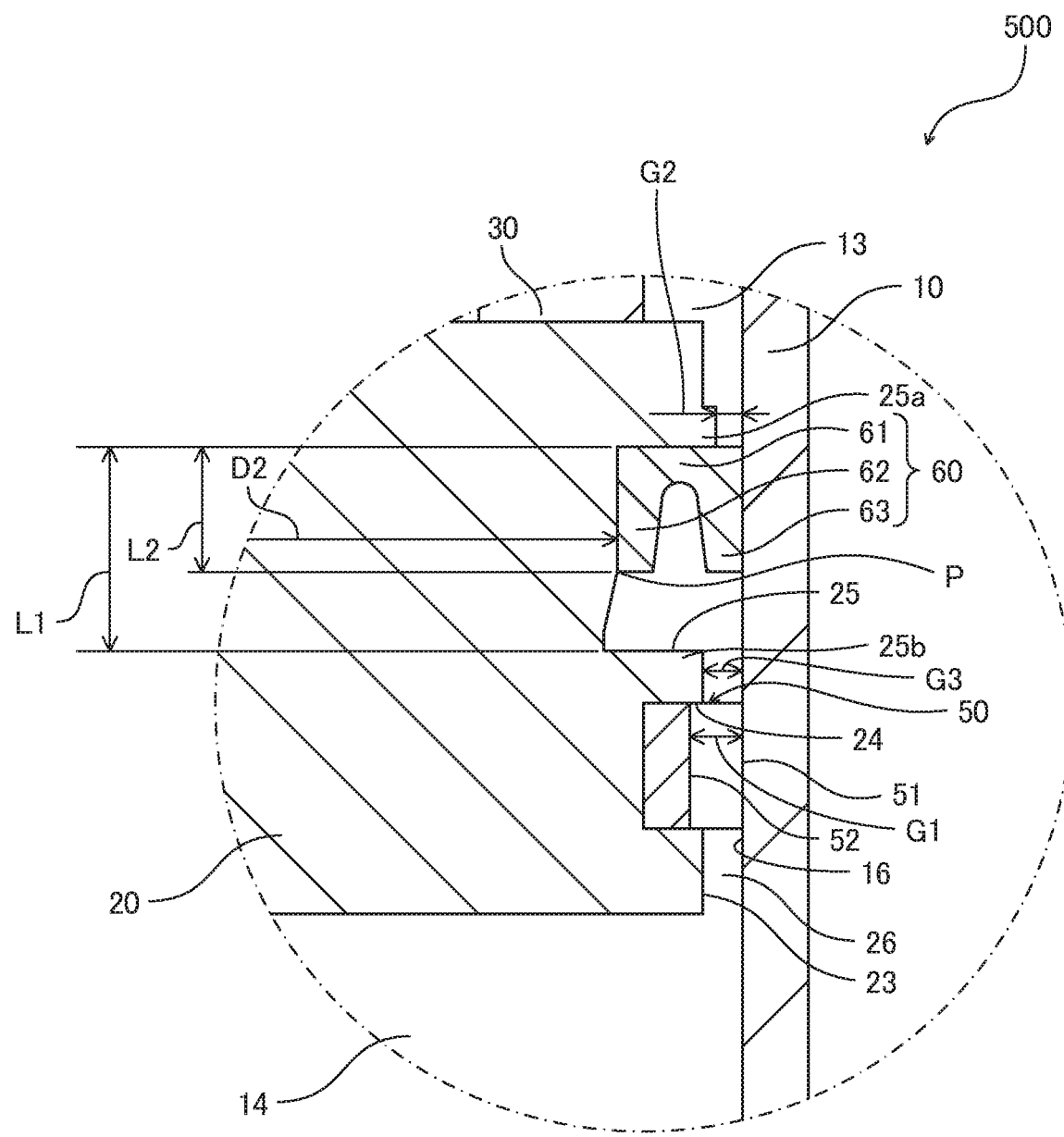
FIG. 16 is an enlarged sectional view of a hydraulic cylinder according to a fifth embodiment of the present invention and illustrates a state where the pressure in the rod side chamber is equal to or lower than the pressure in the anti-rod side chamber.
Figure 17:
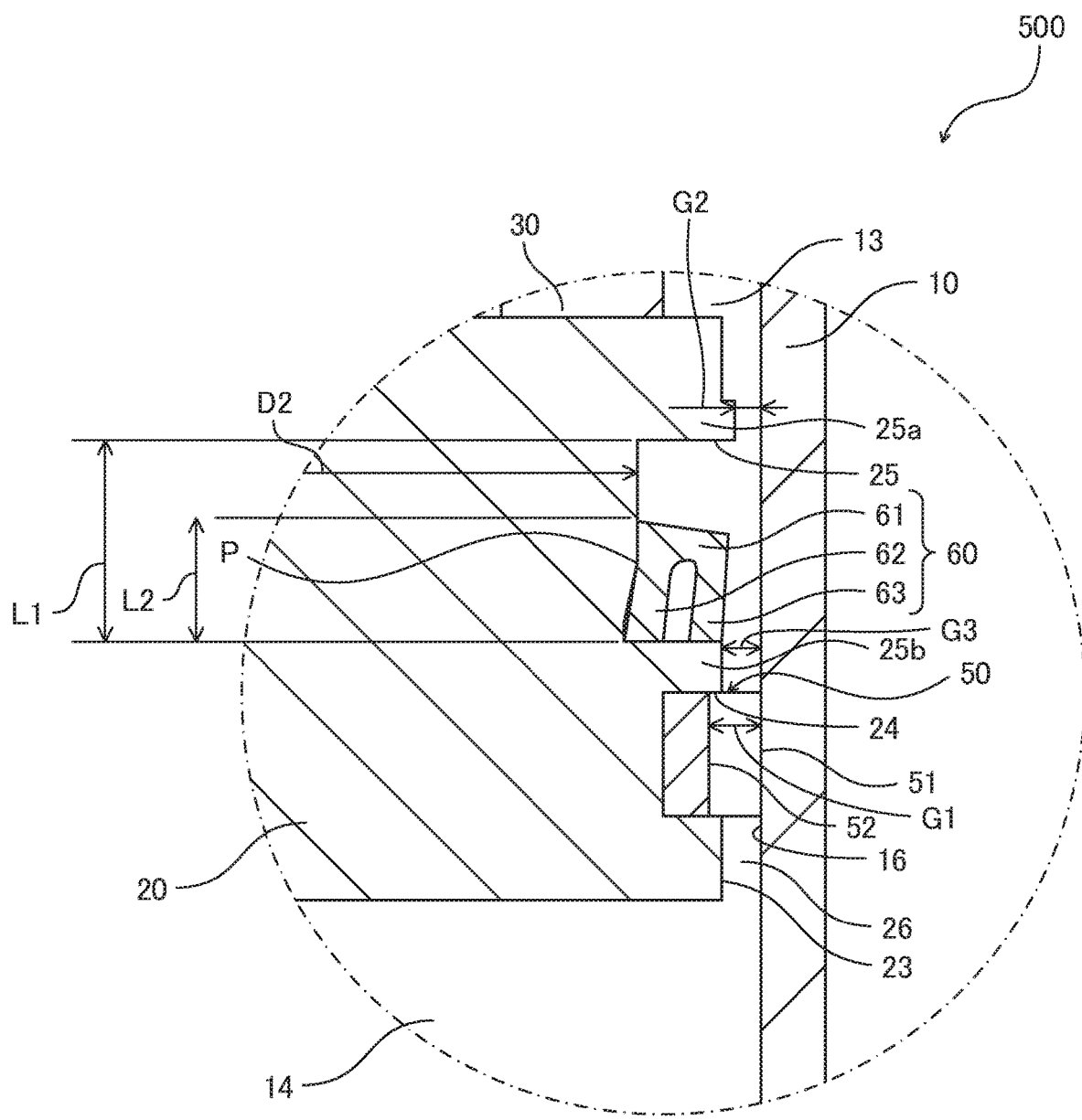
FIG. 17 is an enlarged sectional view of the hydraulic cylinder according to the fifth embodiment of the present invention and shows a state where the pressure in the rod side chamber is higher than the pressure in the anti-rod side chamber.

FIGS. 16 and 17 are enlarged sectional views of a periphery of the seal 60 in this embodiment. FIG. 16 illustrates a state where the pressure in the rod side chamber 13 is equal to or lower than the pressure in the anti-rod side chamber 14, and FIG. 17 illustrates a state where the pressure in the rod side chamber 13 is higher than the pressure in the anti-rod side chamber 14. The depth G1 of the groove 52 is greater than the interval G2 between the outer peripheral surface of the wall 25a serving as the first limiting portion and the inner peripheral surface 16 of the cylinder tube 10. The interval G3 between the outer peripheral surface of the wall 25b serving as the second limiting portion and the inner peripheral surface 16 of the cylinder tube 10 is greater than the interval G2 between the outer peripheral surface of the wall 25a serving as the first limiting portion and the inner peripheral surface 16 of the cylinder tube 10. The depth G1 of the groove 52 is greater than the interval G3 between the outer peripheral surface of the wall 25b serving as the second limiting portion and the inner peripheral surface 16 of the cylinder tube 10.

As illustrated in FIGS. 16 and 17, a dimension L1 between the walls 25a and 25b (first and second limiting portions) faced with each other in the axial direction of the piston 20 in the seal groove 25 is larger than a dimension L2 of the seal 60.

Therefore, the seal 60 moves to the rod side chamber 13 side when it receives the pressure of the operating oil from the anti-rod side chamber 14 side and is pressed onto the wall 25a (first limiting portion) in the seal groove 25 on the rod side chamber 13 side (see FIG. 16). Moreover, the seal 60 moves to the anti-rod side chamber 14 side when it receives the pressure of the operating oil from the rod side chamber 13 side and is pressed onto the wall 25b (second limiting portion) in the seal groove 25 on the anti-rod side chamber 14 side (see FIG. 17).

The outer diameter D2 of the piston 20 is substantially constant within a range between the wall 25a of the seal groove 25 and a point P where the distal end of the first extending portion 62 on the anti-rod side chamber 14 side is located in a state where the seal 60 is pressed onto the wall 25a. Thus, in the state where the seal 60 is pressed onto the wall 25a (first limiting portion) in the seal groove 25 on the rod side chamber 13 side (see FIG. 16), each of the first and second extending portions 62 and 63 is sufficiently pressed to the piston 20 and the cylinder tube 10, respectively. Therefore, a gap is hardly formed between the seal 60 and the cylinder tube 10, and the leaking-out of the operating oil from the anti-rod side chamber 14 to the rod side chamber 13 can be prevented more reliably.

Moreover, the outer diameter D2 of the piston 20 is smaller from the point P toward the wall 25b of the seal groove 25. Thus, in the state where the seal 60 is pressed onto the wall 25b (second limiting portion) in the seal groove 25 on the anti-rod side chamber 14 side (see FIG. 17), each of the first and second extending portions 62 and 63 is not sufficiently pressed to the piston 20 and the cylinder tube 10, respectively. Therefore, a gap is easily formed between the seal 60 and the cylinder tube 10, and the operating oil in the rod side chamber 13 can be discharged to the anti-rod side chamber 14 more reliably.

Even in a form in which the outer diameter D2 of the piston is smaller from the wall 25a toward the wall 25b of the seal groove 25, a gap can be formed easily between the seal 60 and the cylinder tube 10 in the state where the seal 60 is pressed onto the wall 25b. However, in this form, the gap can be formed easily between the seal 60 and the cylinder tube 10 in the state where the seal 60 is pressed onto the wall 25a as compared with the form (form illustrated in FIG. 15) in which the outer diameter D2 of the piston 20 is substantially constant between the wall 25a and the point P. From this reason, the outer diameter D2 of the piston in the seal groove 25 is more preferably substantially constant within a range between the wall 25a and the point P.

Since an operation of the hydraulic cylinder 500 according to the fifth embodiment is substantially the same as the operation of the hydraulic cylinder 100 according to the first embodiment, the explanation will be omitted here.

According to the aforementioned fifth embodiment, in addition to the effect exerted by the first embodiment, the following effects are exerted.

The outer diameter D2 of the piston 20 in the seal groove 25 gets smaller as it goes from the rod side chamber 13 side toward the anti-rod side chamber 14. Thus, when the pressure in the rod side chamber 13 is higher than the pressure in the anti-rod side chamber 14, a gap can be formed easily between the seal 60 and the cylinder tube 10. Therefore, the operating oil in the rod side chamber 13 can be discharged to the anti-rod side chamber 14 more reliably.

Constitution, actions and effects of the embodiments of the present invention will be described below in general.

In this embodiment, each of the hydraulic cylinders 100, 200, 300, 400, and 500 includes the cylinder tube 10, the piston 20 accommodated in the cylinder tube 10, the piston 20 being configured to partition the inside of the cylinder tube 10 into the rod side chamber 13 and the anti-rod side chamber 14 to/from which the operating oil is supplied/discharged, the piston rod 30 coupled with the piston 20, the bearing 50 provided on the outer periphery of the piston 20, the bearing being configured to slidably support the piston 20 with respect to the cylinder tube 10 and the annular seal 60 provided on the outer periphery of the piston 20 and characterized in that the bearing 50 includes the through passage 53 configured to penetrate in the axial direction of the piston 20, and the seal 60 shuts off the flow of the operating oil from the anti-rod side chamber 14 toward the rod side chamber 13 through the through passage 53 when the pressure in the rod side chamber 13 is equal to or lower than the pressure in the anti-rod side chamber 14 and allows the flow of the operating oil from the rod side chamber 13 toward the anti-rod side chamber 14 through the through passage 53 when the pressure in the rod side chamber 13 is higher than the pressure in the anti-rod side chamber 14.

In this constitution, when the pressure in the rod side chamber 13 is higher than the pressure in the anti-rod side chamber 14, the operating oil in the rod side chamber 13 flows to the anti-rod side chamber 14 through the through passage 53 provided on the bearing 50, and there is no need to provide a passage in the piston 20. Therefore, the flow resistance in the passage from the rod side chamber 13 to the anti-rod side chamber 14 can be reduced, and the operating oil collecting in the rod side chamber 13 can be discharged to the anti-rod side chamber 14 more reliably.

Moreover, in this embodiment, the through passage 53 is characterized by being defined by the groove 52 formed on the outer peripheral surface 51 of the bearing 50 and configured to extend in the axial direction of the piston 20, and the inner peripheral surface 16 of the cylinder tube 10.

In this constitution, since the through passage 53 is defined by the inner peripheral surface 16 of the cylinder tube 10 with the groove 52 of the bearing 50, the through passage 53 communicates with the piston gap 26 between the outer peripheral surface 23 of the piston 20 and the inner peripheral surface 16 of the cylinder tube 10 without going through the bent passage. Therefore, the flow resistance in the passage from the rod side chamber 13 to the anti-rod side chamber 14 can be reduced, and the operating oil collecting in the rod side chamber 13 can be discharged to the anti-rod side chamber 14 more reliably.

Moreover, in this embodiment, the seal 60 has the base portion 61, the first extending portion 62 configured to extend from the inner side of the base portion 61 toward the anti-rod side chamber 14 side, and the second extending portion 63 configured to extend from the outer side of the base portion 61 toward the anti-rod side chamber 14 side and having the gap 64 between that and the first extending portion 62 and is characterized in that the seal 60 allows the flow of the operating oil from the rod side chamber 13 toward the anti-rod side chamber 14 through the through passage 53 by the second extending portion 63 getting closer to the first extending portion 62 when the pressure in the rod side chamber 13 is higher than the pressure in the anti-rod side chamber 14.

In this constitution, a passage is formed between the second extending portion 63 and the cylinder tube 10 since the second extending portion 63 gets closer to the first extending portion 62. This passage communicates with the piston gap 26 between the outer peripheral surface 23 of the piston 20 and the inner peripheral surface 16 of the cylinder tube 10 without going through the bent passage. Therefore, the flow resistance in the passage from the rod side chamber 13 to the anti-rod side chamber 14 can be reduced, and the operating oil collecting in the rod side chamber 13 can be discharged to the anti-rod side chamber 14 more reliably.

Moreover, in this embodiment, the second extending portion 63 is characterized in that the dimension in the radial direction of the seal 60 is smaller than that of the first extending portion 62.

In this constitution, since the second extending portion 63 has the dimension in the radial direction of the seal 60 smaller than that of the first extending portion 62, the rigidity of the second extending portion 63 is lower than the rigidity of the first extending portion 62, and the second extending portion 63 can be deformed more easily than the first extending portion 62. Thus, when the pressure in the rod side chamber 13 is higher than the pressure in the anti-rod side chamber 14, a passage is formed between the second extending portion 63 and the cylinder tube 10. This passage communicates with the piston gap 26 between the outer peripheral surface 23 of the piston 20 and the inner peripheral surface 16 of the cylinder tube 10 without going through a bent passage. Therefore, the flow resistance in the passage from the rod side chamber 13 to the anti-rod side chamber 14 can be reduced, and the operating oil collecting in the rod side chamber 13 can be discharged to the anti-rod side chamber 14 more reliably.

Moreover, in this embodiment, since the outer diameter D4 of the base portion 61 is smaller than the inner diameter D3 of the cylinder tube 10, and the outer diameter D5 of the second extending portion 63 is characterized to be larger from the rod side chamber 13 toward the anti-rod side chamber 14.

In this constitution, since the outer diameter D4 of the base portion 61 is smaller than the inner diameter D3 of the cylinder tube 10, and the outer diameter D5 of the second extending portion 63 is larger from the rod side chamber 13 toward the anti-rod side chamber 14, the partial gap is formed between the seal 60 and the cylinder tube 10. Thus, when the pressure in the rod side chamber 13 is higher than the pressure in the anti-rod side chamber 14, the pressure of the operating oil in the rod side chamber 13 acts up to the distal end of the outer peripheral surface of the second extending portion 63, and the second extending portion 63 can be deformed easily toward the first extending portion 62. Therefore, the passage can be formed between the second extending portion 63 and the cylinder tube 10 more reliably. This passage communicates with the piston gap 26 between the outer peripheral surface 23 of the piston 20 and the inner peripheral surface 16 of the cylinder tube 10 without going through a bent passage. Therefore, the flow resistance in the passage from the rod side chamber 13 to the anti-rod side chamber 14 can be reduced, and the operating oil collecting in the rod side chamber 13 can be discharged to the anti-rod side chamber 14 more reliably.

Moreover, in this embodiment, the piston 20 is characterized by having the wall 25a of the seal groove 25 or the step portion 27 provided closer to the rod side chamber 13 side than the seal 60 on the outer periphery of the piston 20, the wall 25a or the step portion 27 being configured to limit movement of the seal 60 to the rod side chamber 13 side.

In this constitution, since the wall 25a of the seal groove 25 or the step portion 27 limits movement of the seal 60 to the rod side chamber 13 side, even if the pressure of the operating oil acts on the seal 60 from the anti-rod side chamber 14 side, removal of the seal 60 from the piston 20 can be prevented.

Moreover, in this embodiment, the outer diameter D4 of the end portion in the seal 60 on the rod side chamber 13 side is characterized by being smaller than the outer diameter D6 of the wall 25a of the seal groove 25.

In this constitution, since the outer diameter D4 of the end portion in the seal 60 on the rod side chamber 13 side is smaller than the outer diameter D6 of the wall 25a of the seal groove 25, even if the pressure of the operating oil acts on the seal 60 from the anti-rod side chamber 14 side, the seal 60 does not protrude from the wall 25a of the seal groove 25 and does not enter the piston gap 26 between the piston 20 and the cylinder tube 10. Therefore, damage on the seal 60 caused by entry into the piston gap 26 between the piston 20 and the cylinder tube 10 can be prevented.

Moreover, this embodiment is characterized by further including the backup ring 70 provided in contact with the inner peripheral surface 16 of the cylinder tube 10 between the seal 60 and the wall 25a of the seal groove 25 and having rigidity higher than that of the seal 60.

In this constitution, since the backup ring 70 is provided in contact with the inner peripheral surface 16 of the cylinder tube 10, even if the pressure of the operating oil acts on the seal 60 from the anti-rod side chamber 14 side, the seal 60 does not enter the piston gap 26 between the piston 20 and the cylinder tube 10. Therefore, damage on the seal 60 caused by entry into the piston gap 26 between the piston 20 and the cylinder tube 10 can be prevented.

Moreover, in this embodiment, the seal 60 is characterized by having the backup portion 65 provided on the outer side in the radial direction of the seal 60 and on the wall 25a side of the seal groove 25 and having rigidity higher than that of the other portions of the seal 60.

In this constitution, since the backup portion 65 is provided on the outer side in the radial direction of the seal 60 and on the wall 25a side of the seal groove 25, even if the pressure of the operating oil acts on the seal 60 from the anti-rod side chamber 14 side, the seal 60 does not enter the piston gap 26 between the piston 20 and the cylinder tube 10. Therefore, damage on the seal 60 caused by entry into the piston gap 26 between the piston 20 and the cylinder tube 10 can be prevented.

Moreover, in this embodiment, the piston 20 is characterized by having the wall 25b of the seal groove 25 provided closer to the anti-rod side chamber 14 side than the seal 60 on the outer periphery of the piston 20, the wall 25b being configured to limit movement of the seal 60 to the anti-rod side chamber 14 side, and the interval between the walls 25a and 25b of the seal groove 25 is larger than the dimension in the axial direction of the piston 20 in the seal 60 and the outer diameter D2 of the piston is smaller from the wall 25a toward the wall 25b of the seal groove 25.

In this constitution, the outer diameter D2 of the piston 20 is smaller from the wall 25a toward the wall 25b of the seal groove 25. Thus, when the pressure in the rod side chamber 13 is higher than the pressure in the anti-rod side chamber 14, the gap can be formed easily between the seal 60 and the cylinder tube 10. Therefore, the operating oil in the rod side chamber 13 can be discharged to the anti-rod side chamber 14 more reliably.

Embodiments of this invention were described above, but the above embodiments are merely examples of applications of this invention, and the technical scope of this invention is not limited to the specific constitutions of the above embodiments.

This application claims priority based on Japanese Patent Application No. 2015-100031 filed with the Japan Patent Office on May 15, 2015, the entire contents of which are incorporated into this specification.

The invention claimed is:

1. A hydraulic cylinder, comprising:
   a cylinder tube;
   a piston accommodated in the cylinder tube, the piston being configured to partition an inside of the cylinder tube into a rod side chamber and an anti-rod side chamber to/from which an operating liquid is supplied/discharged;
   a piston rod coupled with the piston;
   a bearing provided on an outer periphery of the piston, the bearing being configured to slidably support the piston with respect to the cylinder tube; and
   an annular seal provided on the outer periphery of the piston, wherein
   the bearing includes at least one through passage configured to penetrate in an axial direction of the piston; and
   the seal is configured to shut off a flow of the operating liquid from the anti-rod side chamber toward the rod side chamber through the at least one through passage when a pressure in the rod side chamber is equal to or lower than a pressure in the anti-rod side chamber, and is configured to allow the flow of the operating liquid from the rod side chamber toward the anti-rod side chamber through the at least one through passage when the pressure in the rod side chamber is higher than the pressure in the anti-rod side chamber;
   the piston includes an annular first limiting portion provided closer to a rod side chamber side than is the seal on the outer periphery of the piston, the first limiting portion being configured to limit movement of the seal to the rod side chamber side;
   the at least one through passage comprises a groove formed in an outer peripheral surface of the bearing and extending in the axial direction of the piston; and
   a depth of the groove of the at least one through passage is greater than an interval between an outer peripheral surface of the annular first limiting portion and an inner peripheral surface of the cylinder tube.

2. The hydraulic cylinder according to claim 1, wherein the seal includes:
   a base portion;
   a first extending portion configured to extend from an inner side of the base portion to an anti-rod side chamber side; and
   a second extending portion configured to extend from an outer side of the base portion to the anti-rod side chamber side and having a gap between the second extending portion and the first extending portion, wherein
   the seal is configured to allow the flow of the operating liquid from the rod side chamber toward the anti-rod side chamber through the at least one through passage by causing the second extending portion to get closer to the first extending portion when the pressure in the rod side chamber is higher than the pressure in the anti-rod side chamber.

3. The hydraulic cylinder according to claim 2, wherein the second extending portion has a dimension in a radial direction of the seal smaller than a dimension in the radial direction of the seal of the first extending portion.

4. The hydraulic cylinder according to claim 2, wherein an outer diameter of the base portion is smaller than an inner diameter of the cylinder tube; and
   an outer diameter of the second extending portion increases when approaching the anti-rod side chamber from the rod side chamber.

5. The hydraulic cylinder according to claim 1, wherein an outer diameter of an end portion in the seal on the rod side chamber side is smaller than an outer diameter of the first limiting portion.

6. The hydraulic cylinder according to claim 1, further comprising a backup ring provided in contact with the inner peripheral surface of the cylinder tube between the seal and the first limiting portion, the backup ring having a rigidity higher than a rigidity of the seal.

7. The hydraulic cylinder according to claim 1, wherein the seal has a backup portion provided on an outer side in a radial direction of the seal and on a first limiting portion side, the backup portion having a rigidity higher than a rigidity of other portions of the seal.

8. The hydraulic cylinder according to claim 1, wherein:
   the piston has an annular second limiting portion provided closer to an anti-rod side chamber side than is the seal on the outer periphery of the piston, the second limiting portion being configured to limit movement of the seal to the anti-rod side chamber side;
   an interval between the first and second limiting portions is larger than a dimension in an axial direction of the seal; and an outer diameter of the piston becomes smaller when approaching the second limiting portion from the first limiting portion.

9. The hydraulic cylinder according to claim 1, wherein the at least one through passage comprises a plurality of through passages.

10. The hydraulic cylinder according to claim 1, wherein the bearing is disposed closer to the rod side chamber side than is the seal.

11. The hydraulic cylinder according to claim 1, wherein:
the piston includes an annular second limiting portion provided closer to an anti-rod side chamber side than is the seal on the outer periphery of the piston, the second limiting portion being configured to limit movement of the seal to the anti-rod side chamber side; and
an interval between an outer peripheral surface of the annular second limiting portion and the inner peripheral surface of the cylinder tube is greater than the interval between the outer peripheral surface of the annular first limiting portion and the inner peripheral surface of the cylinder tube.

12. The hydraulic cylinder according to claim 11, wherein the depth of the groove of the at least one through passage is greater than the interval between the outer peripheral surface of the annular second limiting portion and the inner peripheral surface of the cylinder tube.

13. A hydraulic cylinder, comprising:
a cylinder tube;
a piston accommodated in the cylinder tube, the piston being configured to partition an inside of the cylinder tube into a rod side chamber and an anti-rod side chamber to/from which an operating liquid is supplied/discharged;
a piston rod coupled with the piston;
a bearing provided on an outer periphery of the piston, the bearing being configured to slidably support the piston with respect to the cylinder tube; and
an annular seal provided on the outer periphery of the piston, wherein
the bearing includes at least one through passage configured to penetrate in an axial direction of the piston;
the seal is configured to shut off a flow of the operating liquid from the anti-rod side chamber toward the rod side chamber through the at least one through passage when a pressure in the rod side chamber is equal to or lower than a pressure in the anti-rod side chamber, and is configured to allow the flow of the operating liquid from the rod side chamber toward the anti-rod side chamber through the at least one through passage when the pressure in the rod side chamber is higher than the pressure in the anti-rod side chamber;
the piston includes:
an annular first limiting portion provided closer to the rod side chamber side than is the seal on the outer periphery of the piston, the first limiting portion being configured to limit movement of the seal to a rod side chamber side; and
an annular second limiting portion provided closer to the anti-rod side chamber side than is the seal on the outer periphery of the piston, the second limiting portion being configured to limit movement of the seal to the anti-rod side chamber side; and
an interval between an outer peripheral surface of the annular second limiting portion and an inner peripheral surface of the cylinder tube is greater than an interval between the outer peripheral surface of the annular first limiting portion and the inner peripheral surface of the cylinder tube.

14. A hydraulic cylinder, comprising:
a cylinder tube;
a piston accommodated in the cylinder tube, the piston being configured to partition an inside of the cylinder tube into a rod side chamber and an anti-rod side chamber to/from which an operating liquid is supplied/discharged;
a piston rod coupled with the piston;
a bearing provided on an outer periphery of the piston, the bearing being configured to slidably support the piston with respect to the cylinder tube; and
an annular seal provided on the outer periphery of the piston, wherein
the bearing includes at least one through passage configured to penetrate in an axial direction of the piston;
the seal is configured to shut off a flow of the operating liquid from the anti-rod side chamber toward the rod side chamber through the at least one through passage when a pressure in the rod side chamber is equal to or lower than a pressure in the anti-rod side chamber, and is configured to allow the flow of the operating liquid from the rod side chamber toward the anti-rod side chamber through the at least one through passage when the pressure in the rod side chamber is higher than the pressure in the anti-rod side chamber;
the piston includes an annular second limiting portion provided closer to an anti-rod side chamber side than is the seal on the outer periphery of the piston, the second limiting portion being configured to limit movement of the seal to the anti-rod side chamber side;
the at least one through passage comprises a groove formed in an outer peripheral surface of the bearing and extending in the axial direction of the piston; and
a depth of the groove of the at least one through passage is greater than an interval between an outer peripheral surface of the annular second limiting portion and an inner peripheral surface of the cylinder tube.

* * * * *